US009064232B2

(12) United States Patent
Laine et al.

(10) Patent No.: US 9,064,232 B2
(45) Date of Patent: Jun. 23, 2015

(54) SYSTEM AND METHOD FOR HYBRID COURSE INSTRUCTION

(75) Inventors: Kendall Laine, Redondo Beach, CA (US); Dave O'Neal, Bristow, VA (US); Beth Haden, Goshen, NY (US); Magnus Nylund, Reston, VA (US)

(73) Assignee: Learning Tree International, Inc., Reston, VA (US)

( * ) Notice: Subject to any disclaimer, the term of this patent is extended or adjusted under 35 U.S.C. 154(b) by 500 days.

(21) Appl. No.: 12/755,838

(22) Filed: Apr. 7, 2010

(65) Prior Publication Data

US 2010/0279266 A1 Nov. 4, 2010

Related U.S. Application Data

(60) Provisional application No. 61/167,364, filed on Apr. 7, 2009.

(51) Int. Cl.
| | | |
|---|---|---|
| *G09B 3/00* | (2006.01) | |
| *G06Q 10/10* | (2012.01) | |
| *G09B 5/06* | (2006.01) | |
| *G09B 7/02* | (2006.01) | |
| *G09B 5/00* | (2006.01) | |
| *G09B 7/00* | (2006.01) | |
| *G09B 19/00* | (2006.01) | |
| *G06Q 50/20* | (2012.01) | |

(52) U.S. Cl.
CPC ........ *G06Q 10/10* (2013.01); *G09B 5/06* (2013.01); *G09B 7/02* (2013.01); *G09B 5/00* (2013.01); *G09B 7/00* (2013.01); *G09B 19/00* (2013.01); *G06Q 50/20* (2013.01)

(58) Field of Classification Search
USPC ........................................... 434/350
See application file for complete search history.

(56) References Cited

U.S. PATENT DOCUMENTS

| | | | | |
|---|---|---|---|---|
| 5,767,897 | A * | 6/1998 | Howell | 348/14.07 |
| 6,024,577 | A * | 2/2000 | Wadahama et al. | 434/322 |
| 6,155,840 | A * | 12/2000 | Sallette | 434/323 |
| 6,813,473 | B1 * | 11/2004 | Bruker | 434/350 |
| 6,845,229 | B2 * | 1/2005 | Notomi | 434/350 |
| 6,915,105 | B2 * | 7/2005 | Masuda | 434/350 |
| 7,016,949 | B1 * | 3/2006 | Tagawa | 709/223 |

(Continued)

FOREIGN PATENT DOCUMENTS

| | | |
|---|---|---|
| CN | 1809868 A | 7/2006 |
| JP | 10-123923 A | 5/1998 |

(Continued)

OTHER PUBLICATIONS

"onCampus", Jun. 6, 2007 (http://oncampus.osu.edu/article.php?id=1451).*
"Adobe Connect Enterprise Technical Overview," Copyright 2007, see pp. 2-7 regarding enterprise server components and hosted and license solutions.*

(Continued)

*Primary Examiner* — Xuan Thai
*Assistant Examiner* — Michael Grant
(74) *Attorney, Agent, or Firm* — Miles & Stockbridge P.C.

(57) ABSTRACT

Systems and methods related to providing an electronic presentation to both in-class attendees and remotely located out-of-class attendees, in which video and audio associated with the presentation is provided to the remote attendees, and out-of-class programmable systems are programmed to execute an educational exercise associated with the presentation and be remotely operated by the remote attendees.

16 Claims, 16 Drawing Sheets

(56) References Cited

U.S. PATENT DOCUMENTS

| | | | |
|---|---|---|---|
| 7,058,891 | B2 | 6/2006 | O'Neal et al. |
| 7,092,669 | B2 * | 8/2006 | Sakai et al. ............ 434/350 |
| 7,242,389 | B1 * | 7/2007 | Stern .................... 345/158 |
| 7,391,432 | B2 * | 6/2008 | Terada ............... 348/14.08 |
| 2004/0002048 | A1 * | 1/2004 | Thurmaier et al. ........ 434/350 |
| 2004/0002049 | A1 * | 1/2004 | Beavers et al. .......... 434/350 |
| 2004/0121299 | A1 * | 6/2004 | Rougeau et al. ......... 434/365 |
| 2005/0003330 | A1 * | 1/2005 | Asgarinejad et al. ...... 434/20 |
| 2008/0021740 | A1 * | 1/2008 | Beane et al. ............... 705/3 |

FOREIGN PATENT DOCUMENTS

| | | |
|---|---|---|
| JP | 2002-007586 A | 1/2002 |
| JP | 2002-116684 A | 4/2002 |
| JP | 2002-156894 A | 5/2002 |
| JP | 2003-280506 A | 10/2003 |
| JP | 2003-323387 A | 11/2003 |
| JP | 2004-333525 A | 11/2004 |
| JP | 2005-025399 A | 1/2005 |
| JP | 2007-504517 A | 3/2007 |
| KR | 10-2006-0001391 | 1/2006 |
| KR | 10-0601397 B | 7/2006 |
| KR | 10-2008-0078750 A | 8/2008 |
| WO | 2008-143297 A1 | 11/2008 |

OTHER PUBLICATIONS

"iLinc User Guide", Copyright 2007.*
Notification of Transmittal of the International Search Report and the Written Opinion of the International Searching Authority issued in International Application No. PCT/US2010/030257 dated Nov. 12, 2010.
Japanese Office Action, dated May 21, 2013, issued in corresponding Japanese Application No. 2012-504827, with English translation.
Office Action mailed Dec. 11, 2014 for corresponding Canadian Patent Application No. 2,757,847.
Office Action mailed Jan. 4, 2015 for corresponding Chinese Patent Application No. 201080024675.X.
Japanese Office Action dated Dec. 13, 2013, issued in corresponding Japanese Application No. 2012-504827, with English translation.
Chinese Office Action dated Dec. 9, 2013, issued in corresponding Chinese Patent Application No. 201080024675.X, with English translation.
Canadian Office Action dated Dec. 9, 2013, issued in corresponding Canadian Patent Application No. 2,757,847.
Chinese Office Action dated Jul. 3, 2014, issued in corresponding Chinese Patent Application No. 201080024675.X, with English translation.
Office Action mailed Mar. 8, 2015 for corresponding Israel Application No. 215523 and English language translation.

* cited by examiner

410

Share – [Left]

Partition Range Example

927-9-13

- Syntax:
  ```
  CREATE TABLE offering_hist (
    offering_id      NUMBER(6)   NOT NULL
    course_id        NUMBER(3)   NOT NULL
    instructor_id    NUMBER(4)   NOT NULL
    site_id          NUMBER(2)   NOT NULL
    start_date       DATE        NOT NULL
    max_no_students  NUMBER(2) )
  TABLESPACE tbspc1
  PARTITION BY RANGE (start_date)
  ,(PARTITION p1 VALUES LESS THAN (TO_DATE('01-JAN-2004','DD-MON-YYYY'))
  ,(PARTITION p1 VALUES LESS THAN (TO_DATE('01-JAN-2005','DD-MON-YYYY'))
  ,(PARTITION p1 VALUES LESS THAN (TO_DATE('01-JAN-2006','DD-MON-YYYY'))
  ,(PARTITION p1 VALUES LESS THAN (TO_DATE('01-JAN-2007','DD-MON-YYYY'))
  ,(PARTITION p1 VALUES LESS THAN (TO_DATE('01-JAN-2008','DD-MON-YYYY')) );
  ```

- Tablespace tbspc1 is the default tablespace for all partitions 927-9-13

— 411

[Full Screen ▼]   ⚙

SYSTEM AND METHOD FOR HYBRID COURSE INSTRUCTION

CLAIM OF PRIORITY

This application claims priority to U.S. Provisional Patent Application No. 61/167,364, filed on Apr. 7, 2009, which is hereby included by reference in its entirety.

BACKGROUND OF THE INVENTION

1. Field of the Invention

This invention relates to systems and methods for students at locations remote from a presenter or classroom to participate in educational activities.

2. Background

The disclosed subject matter relates to, among other things, a system and method for hybrid course instruction, in which remotely situated learners are able to simultaneously participate in presentations or classes along with in-class counterparts actually situated in a presentation area or classroom with a presenter or instructor.

Virtual participation in classrooms enables high-quality classroom courses to be delivered via collaborative, live training sessions with instructors and learners who are based in different locations. The training may include multimedia presentations, software simulations, application sharing, and participant interaction. Multimedia Training Content employed in virtual classroom instruction may include, but is not limited to: PowerPoint presentations including animation, screen transitions, and real-time annotations; Dynamic and interactive Flash content; Streaming audio and video of the course instructor; and Shared Web browsers. Virtual training sessions can be recorded and shared, allowing attendees the opportunity to review content asynchronously after the live event.

Virtual classroom instruction includes real-time sharing of documents, software demonstrations, live polling, live chat/instant messaging, and shared whiteboards allowing virtual class participants to interact collaboratively. Instructors and participants may also share and pass control of their desktop applications.

Active learning is enhanced via simultaneous small-group collaborative activities, known as breakout sessions.

Streaming video integration is provided, by which video content engages course participants and aids in knowledge retention.

To meet the needs of customers who require self-paced, asynchronous training content, custom enterprise-wide solutions for large organizations may be provided. These solutions combine live classroom training supplemented with asynchronous, online training and include virtual versions of classroom activities. Provided modules may be standards compliant (SCORM or AICC) and integrate with the most common Learning Management Systems (LMS).

Custom, blended-solution and asynchronous module features include: training presentations, multimedia delivery of lecture content, streaming video content, in-line quizzes and assessments, software demonstration videos, live remote hands-on exercises (e.g., for IT courses), 24×7 access to course virtual exercise labs, software simulations, and LMS integration (including SCORM 1.2 and 2004 and AICC).

Hybrid courses bridge the gap between an actual classroom course, in which an instructor and attendees are collocated, and a virtual classroom. In hybrid courses, remote attendees can participate simultaneously in the classroom session almost as though they were attending in person. Virtually all of the features available in the virtual classroom environment are available to enhance the remote attendees' hybrid training experience, including the use of remote hands-on exercises.

Hybrid course technology enables remote learners to participate in live classes along with their in-class counter parts. Streaming of live audio and video of the classroom enables the remote participants to see and hear the course instructor and other in-class students. In separate windows in a remote participant's interface, a remote participant can also observe a real-time view of Learning Tree's MagnaLearn™ instructional enhancement system, which projects the course training materials and instructor annotations. Finally, the hybrid learning system enables remote attendees to control in-class computers so that they may complete the technical hands-on exercise labs. As is done for the classroom attendees, student machines are set up in the classroom for remote users. As a result, hands-on exercises work exactly as in the classroom, allowing the instructor to observe the remote attendees' work as s/he would as that of in-class attendees.

All publications, scientific, patent or otherwise discussed in this application are hereby incorporated by reference in their entirety for all purposes, including U.S. Pat. Nos. 7,058,891; 7,131,068; 7,134,079; and 7,454,708, and U.S. Patent Application Publication No. 2002/0103882.

SUMMARY OF THE INVENTION

The invention relates to systems and methods related to providing an electronic presentation to both in-class attendees and remotely located out-of-class attendees, in which video and audio associated with the presentation is provided to the remote attendees, and out-of-class programmable systems are programmed to execute an educational exercise associated with the presentation and be remotely operated by the remote attendees.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. The present invention may be practiced without some or all of these specific details. In other instances, well known process operations have not been described in detail, in order not to unnecessarily obscure the present invention. Accordingly, the drawings and description are to be regarded as illustrative in nature, and not as restrictive.

BRIEF DESCRIPTION OF THE DRAWINGS

FIG. 5D illustrates an embodiment of left display window 410 included in user interface 400.

FIGS. 5F-1, 5F-2, and 5F-3 illustrate embodiments of audio/video window 430 included in user interface 400.

FIGS. 5I-1, 5I-2, 5I-3, and 5I-4 illustrate an embodiment of technical support window 422 included in user interface 400.

The drawings disclose illustrative embodiments, and do not set forth all embodiments of the invention. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it is intended to refer to the same or like components or steps.

DETAILED DESCRIPTION OF THE DISCLOSED SUBJECT MATTER

Figure 1:
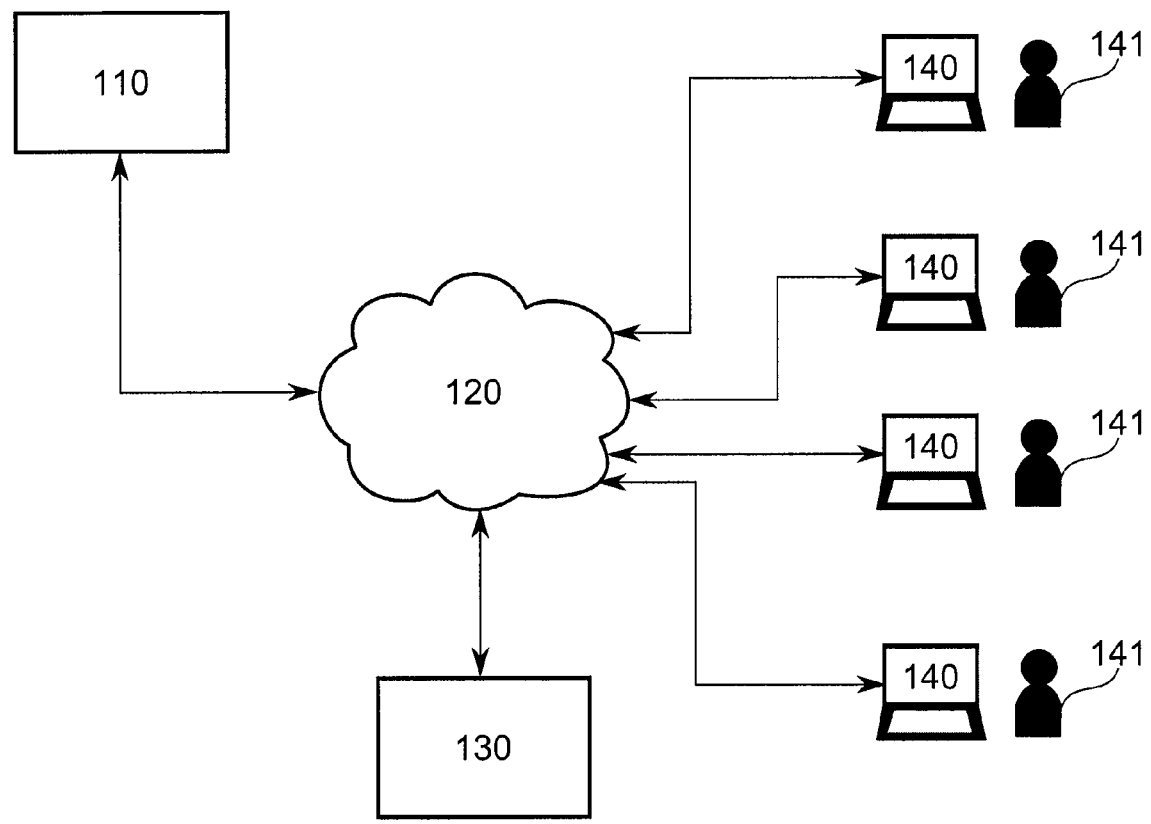
FIG. 1 illustrates an embodiment of the disclosed subject matter, in which a plurality of remote attendees 141 are able to actively participate in an educational session delivered at presentation center 110 by use of remote attendee systems 140.

FIG. 1 illustrates an embodiment of the disclosed subject matter, in which a plurality of remote attendees 141 are able to actively participate in an educational session delivered at presentation center 110 by use of remote attendee systems 140. Presentation center 110 and remote attendee systems 140 are each connected to network 120, such as the Internet. Connection server 130 is also connected to network 120. Each of presentation center 110, connection server 130, and remote attendee systems 140 include a programmed computer, including, but not limited to, desktop or portable computers, connected to network 120. Connection server 130 provides communication services for the hybrid learning system. Presentation center 110 establishes a networking session with connection server 130, and exchanges data therewith. Each of remote attendee systems 140 establishes a separate networking session with connection server 130, and exchanges data therewith. By this mechanism, data provided by presentation center 110 is distributed by connection server 130 to each of remote attendee systems 140. Additionally, data produced by remote attendee systems 140 may be processed by connection server 130 and/or relayed to presentation center 110 and/or other remote attendee systems 140. For example, voice data provided by a first remote attendee system 140 would be provided to presentation center 110, as well as the other remote attendee systems 140, allowing all engaged in an educational session to hear and possibly respond to comments provided by remote attendee 141.

The connection scheme illustrated in FIG. 1 includes a number of benefits. First, by not establishing a direct networking session between remote attendee systems 140 and presentation center 110, the bandwidth required by presentation center 110 can be reduced significantly. This is important for a number of locations at which presentation center 110 may be located, as a high-bandwidth networking link to network 120 may be unavailable or expensive. Instead, only connection server 130 needs to make use of a high bandwidth networking link for broadcasting data received from presentation center 110 to the plurality of remote attendee systems 140. Although not illustrated in FIG. 1, where there is a plurality of simultaneous hybrid learning sessions, each with it own respective presentation center 110 and plurality of remote attendee systems 140, the plurality of presentation centers 110 may all connect to the single connection server 130, and obtaining further benefits in terms of reduced overall networking costs and system administration costs. Second, it is common for a protective firewall to be located between computer systems, such as presentation center 110 and remote participant 140a, and Internet 120. It is often difficult establish direct network sessions with a system positioned behind such a firewall. However, it is generally much simpler for systems behind such firewalls to establish connections to systems such as connection server 130. Thus, establishing the necessary networking sessions for both presentation center 130 and remote attendee systems 140 is simplified by use of connection server 130. Third, in some embodiments where a third-party collaboration technology, such as Abode Acrobat Connect (a product of Abobe Systems of San Jose, Calif.), is employed, a third-party may provide and manage connection server 130, thereby significantly reducing staff and costs that would otherwise be associated with maintaining connection server 130. In one embodiment, connection server 130 is programmed to operate as a Adobe Acrobat Connect server, remote attendee systems 140 are programmed to execute Adobe Acrobat Connect client software that establishes sessions with connection server 130, and programmable systems included in presentation center 110 are programmed to execute Adobe Acrobat Connect client software that establishes sessions with connection server 130. In some embodiments, remote attendee systems receive 140 instructions via network which cause each of the remote attendee systems receive 140 to perform the techniques described below with respect to remote attendee systems 140. For example, by visiting a specified address using a web browser on remote attendee system 140, instructions are retrieved and executed by remote attendee system 140 which cause it to perform the techniques described below with respect to remote attendee systems 140.

Additionally, in some embodiments connection server 130 may be at the same location as presentation center 110, or connection server 130 may be fully integrated into presentation center 110.

Figure 2A:
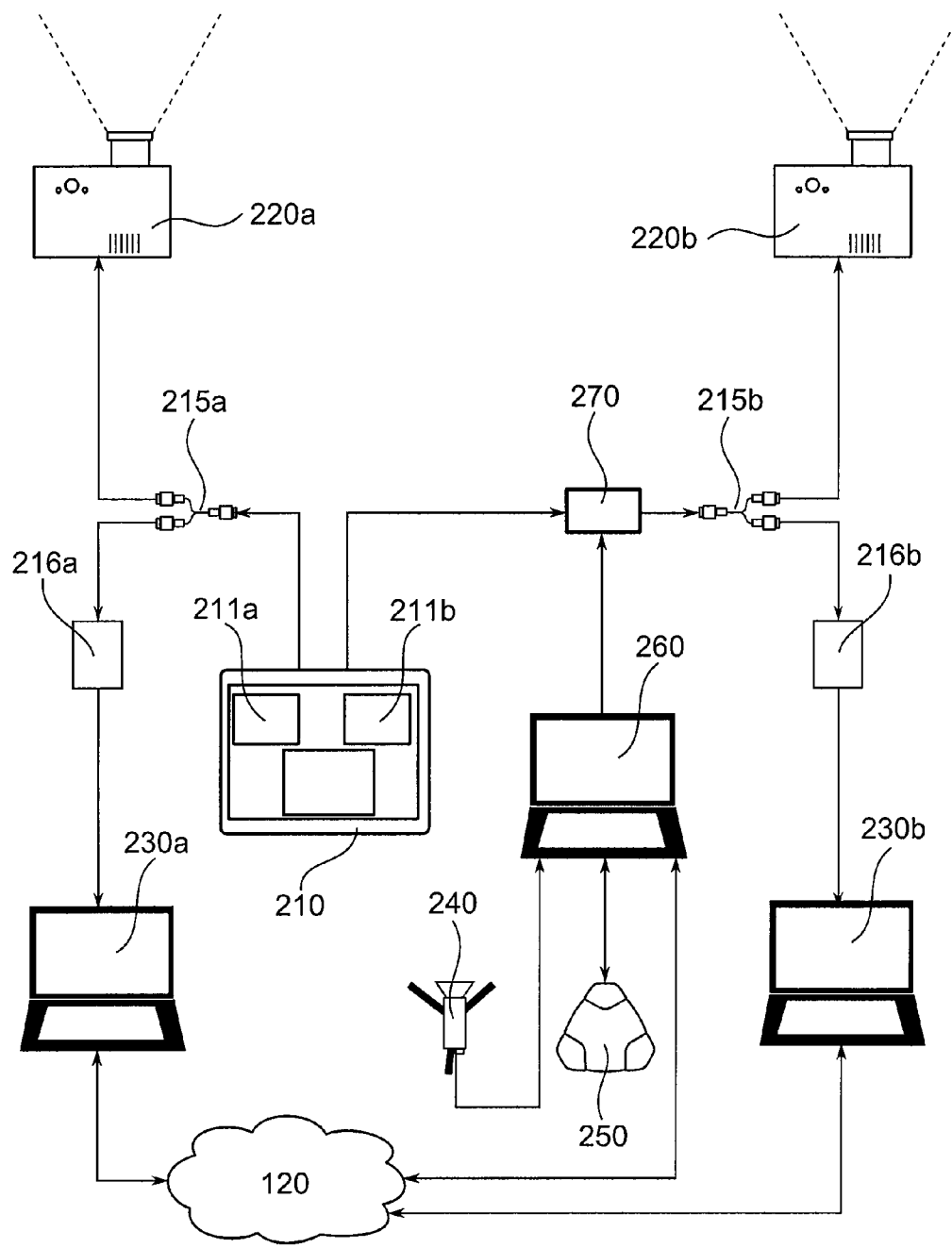
FIG. 2A illustrates a schematic of components included in an embodiment of presentation center 110.

FIG. 2A illustrates a schematic of components included in an embodiment of presentation center 110. A presenter 310 (see FIG. 3) operates console interface 210. In the embodiments illustrated in FIGS. 2A, 2B, and 3, the console utilizes features of the Learning Tree MagnaLearn console, of which various embodiments are described in U.S. Pat. Nos. 7,058,891; 7,131,068; 7,134,079; and 7,454,708, and U.S. Patent Application Publication No. 2002/0103882. Typically, console interface 210 is only visible to presenter 310 during the course of a presentation. As illustrated in FIG. 2A, console interface includes two windows 211a and 211b for displaying left and right slides. The slide shown in left window 211a is directed to left display 220a, and the slide shown in right window 211b is directed to right display 220b. Displays 220a and 220b provide large-format displays that allow local attendees 320 (see FIG. 3) to view, for example, the slides corresponding to windows 211a and 211b. As illustrated in FIG. 2A, displays 220a and 220b are provided by projector devices; however, other display devices are well-known in the art, and include, but are not limited to, rear-projection systems, front-projection systems, plasma display devices, cathode ray tube display devices, and LCD display devices. Console interface 210 outputs display signals corresponding to the slides displayed in windows 211a and 211b. In the embodiment illustrated in FIG. 2A, the display signals are in VGA format, as the VGA display signal format is easily distributed using readily available and inexpensive splitters and switches. However, those skilled in the art would appreciate that other display signal formats could be substituted for the VGA display signal format used in various embodiments illustrated in this disclosure. For example, the DVI video signal format is being used increasingly.

The display signal for left window 211a output by console interface 210 is received by left splitter 215a, which splits and outputs the received signal to left display 220a and left video encoder 216a. The display signal sent to left display 220a is projected for viewing by local attendees 320. The display signal sent to left video encoder 216a converts the VGA display format signal into video data stream for use by left video encoding system 230a. For example, VGA-to-USB video converters are available for providing video data via a computer's USB port. One example is the VGA2USB compact external VGA/RGB signal grabber (manufactured by Epiphan of Ottawa, Ontario, Canada). Left video encoding system 230a is programmed to compress and/or encode the high-bandwidth video data stream into a low-bandwidth video data stream suitable for transmission via network 120 and receipt by connection server 130. For example, Abode Acrobat Connect software includes instructions which cause the programmed computer to encode a video data stream into a format appropriate for transmission via network 120. Those skilled in the art appreciate that left video encoding system 230a may be programmed to perform other video compression techniques known in the art.

The display signal for right window 211b output by console interface 210 is received by 2-port A/B video switch 270. Video switch 270 also receives a display signal from demonstration computer 260, and selectively outputs one of the two received display signals. Although video switch 270 may be operated manually or by a handheld remote for selection of the output display signal. The display signal output by video switch 270 is received by right splitter 215b. The display signal received by right splitter 215b is handled in a similar manner to the display signal received by left splitter 216a. Right splitter 216b splits and outputs the received signal to right display 220b and right video encoder 216b. The display signal sent to right display 220b is projected for viewing by local attendees 320. The display signal sent to right video encoder 216b converts the VGA display format signal into video data stream for use by right video encoding system 230b. Right video encoding system 230b is programmed to compress and/or encode the high-bandwidth video data stream into a low-bandwidth video data stream suitable for transmission via network 120 and receipt by connection server 130.

Demonstration computer 260 is programmed to perform a number of functions. First, demonstration computer 260 receives streaming video from video camera 240. Examples of video camera 240 include, but are not limited to, Communicate STX USB Webcam (by Logitech of Fremont, Calif.), aGent V4 HD USB Webcam (by Liquid Digital Solutions of Victoria, Australia), Canon GL-series camcorder, and FullSight IP 360° Camera (by Sentry 360 Security of Naperville, Ill.). The FullSight IP 360° Camera utilizes a fisheye lens to capture a 360 degree view of the classroom. Data connection interfaces between video camera 240 and demonstration computer 260 include, but are not limited to, IEEE-1394 (also known as Firewire) and USB (Universal Serial Bus). Much as described above with respect to left video encoder system 230a, demonstration computer 260 is programmed to compress and/or encode the high-bandwidth video data received from video camera 240 into a low-bandwidth video data stream suitable for transmission via network 120 and receipt by connection server 130. In some embodiments, video camera 240 is aimed in a fixed direction at a fixed zoom position, so as to provide streaming video of presenter 310 while presenter 310 is at console interface 210. However, in some embodiments, the direction and/or zoom of video camera 240 may be controlled via demonstration computer 260. This allows video camera 240 to be directed at other targets at the presentation site, such as local attendees 320 or presenter 310 while at positions other than console interface 210, such as while operating demonstration computer 260. In one embodiment, demonstration computer 260 is programmed to utilize Adobe Acrobat Connect software to establish a session with connection server 130 for sharing the video with connection server 130, with the video data transmitted via the session provided to remote participants 140.

Figure 4A:
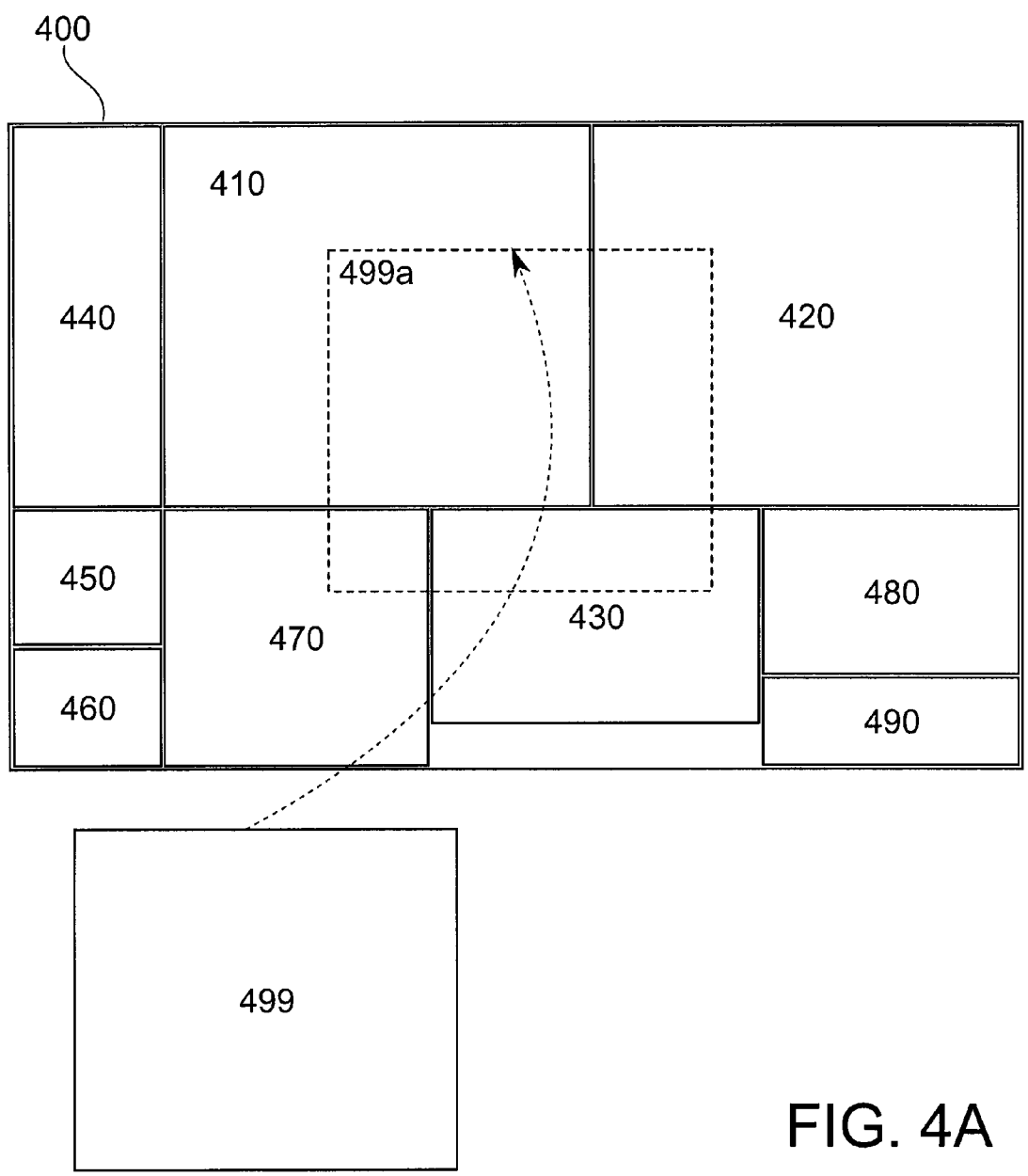
FIGS. 4A and 4B illustrate embodiments of the disclosed subject matter in which various windows included in a user interface.

Additionally, although not illustrated in FIG. 2A, in some embodiments a second video camera may be included, which provides an alternative view of the classroom. As with video data provided by video camera 240, a programmable computer may be programmed to compress and/or encode high-bandwidth video data received from the second video camera into a low-bandwidth video data stream suitable for transmission via network 120 and receipt by connection server 130. As illustrated in FIG. 4F-2, images from both video cameras may simultaneously be displayed by a remote attendee system 140. As illustrated in FIG. 4F-1, presentation center 110 and/or remote attendee system 140 may be programmed to selectively display at remote attendee system 140 video from one of video camera 240 and the second video camera. Presenter 310 or another person associated with the presentation may control presentation center 110 and/or remote attendee system 140 so that the same video is displayed by all remote attendee systems 140. In some embodiments, a remote attendee system 140 may be programmed to allow remote attendee 141 to selectively switch between video from either one of video camera 240 and the second video camera. Use of the second video camera may be useful for periods in a presentation when presenter 310 moves away from console interface 210 to, for example, perform a demonstration at demonstration computer 260.

Figure 3:
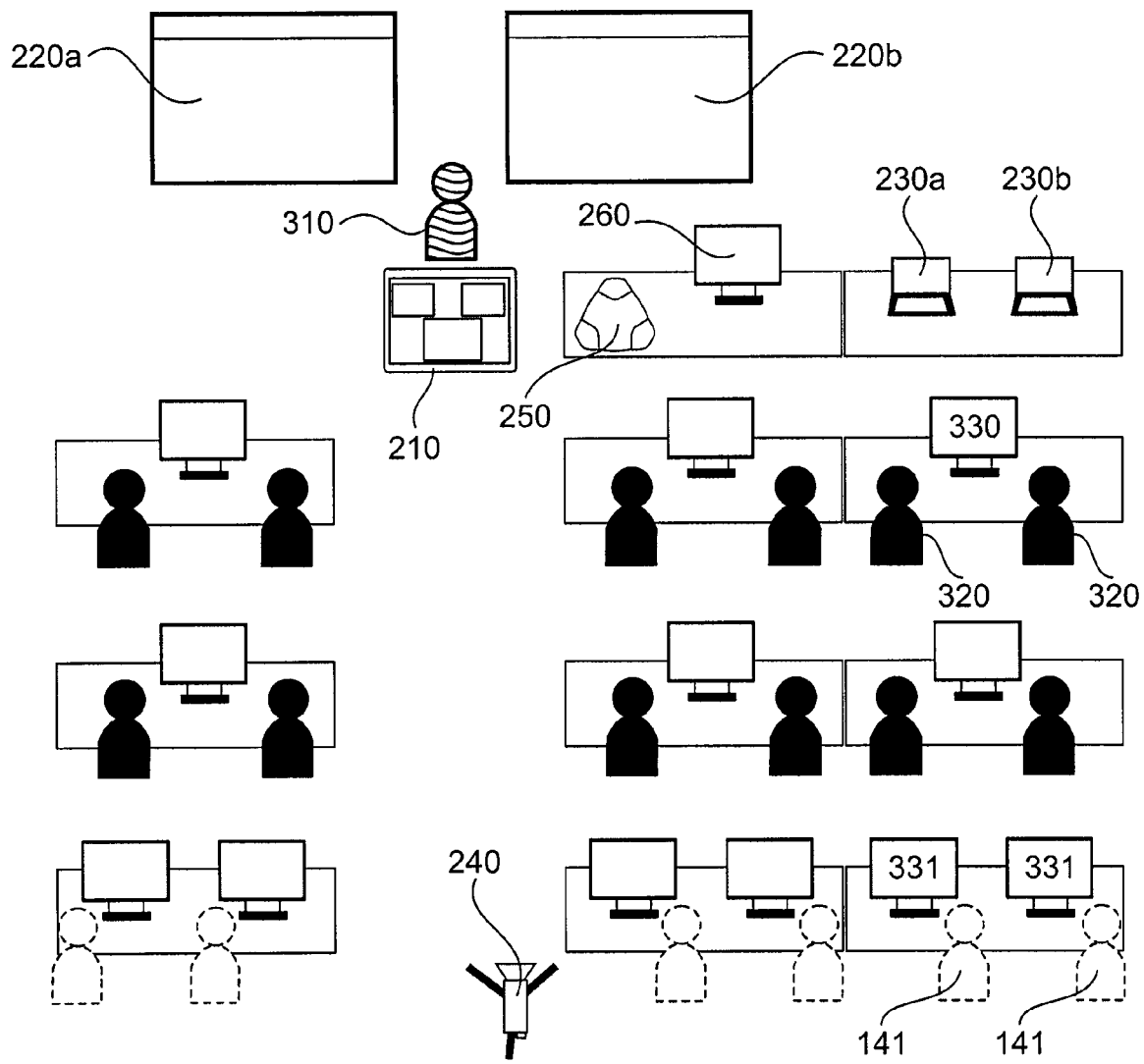
FIG. 3 illustrates an in-classroom arrangement for an embodiment of presentation center 110 including components illustrated in FIG. 2A.

In some embodiments, video camera 240 is a wide-angle camera, such as the FullSight IP 360° Camera discussed above, and remote attendee systems 140 are programmed to provide a control, as illustrated in FIG. 4F-3, that allows a remote attendee 141 to control the field of view displayed at a remote attendee system 140. Rather than move video camera 240 in response to this control, instead only a portion of the video captured by video camera 240, selected via the control, is displayed in audio video window 430 at remote attendee system 140. In such embodiments, each remote attendee 141 may independently control their field of view.

Second, demonstration computer 260 outputs and receives audio via speakerphone 250. Examples of speakerphone 250 includes, but is not limited to, the Chat 150 VC Video Conference Speakerphone (by ClearOne Communications of Salt Lake City, Utah), and Konftel 300 series speakerphone (by Konftel AB of Umeå, Sweden). In some embodiments, speakerphone 250 is connected to demonstration computer 260 via USB, although those skilled in the art appreciate that other techniques may be employed for demonstration computer 260 to send/receive either analog or digital audio signals. Demonstration computer 260 is programmed to compress and/or encode audio signals received from speakerphone 250 into an encoded digital format suitable for transmission via network 120 and receipt by connection server 130. Additionally, demonstration computer 260 is programmed to receive audio data from connection server 130 via network 120, process the received audio data, and output the audio via speakerphone 250. Accordingly, when presenter 310 speaks, speakerphone 250 captures the audio, demonstration computer 260 transmits audio data to connection server 130, and connection server 130 provides the audio data to remote participants 140, thereby allowing the remote participants to hear the presentation given by presenter 310. In circumstances where a remote participant is able to participate in a discussion during the presentation, speech captured by remote participant 140 is transmitted, via connection server 130, to demonstration computer 260 for output at the presentation site. In one embodiment, demonstration computer 260 is programmed to utilize Adobe Acrobat Connect software to establish a session with connection server 130 for transmitting audio data between demonstration computer 260 and connection server 130. Adobe Acrobat Connect software provides a camera and voice module that can be utilized to, with a single session between demonstration computer 260 and connection server 130, share both the video and audio data discussed above. Additionally, speakerphone 250 may be used in conjunction with a standard POTS-based audio conferencing service, to allow a remote user 140 to participate in the audio portion of the presentation via a telephone.

In some embodiments, instead of speakerphone 250, one or more microphones and one or more speakers may be provided, particularly at a site frequently used in conjunction with the disclosed subject matter. The use of more than one microphone may better allow audio conversations by local attendees 320 to be captured. The use of one or more speakers may better ensure each of local attendees 320 is able to hear audio output by demonstration computer 260. In some embodiments, presenter 310 is provided with a wireless headset to ensure voice communication quality regardless of the position of presenter 310 in the classroom.

Figure 4B:
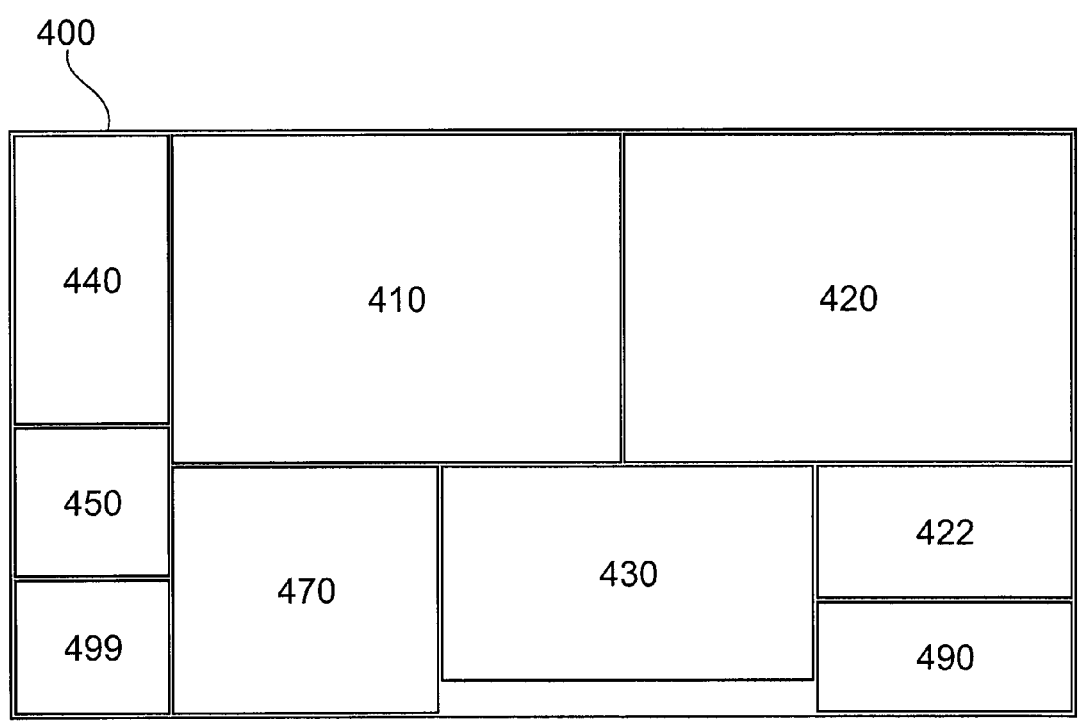

Third, demonstration computer 260 is programmed to control interaction between presentation center 110 and connection server 130, as well as control how the presentation is viewed by remote participants 140. Demonstration computer 260 is used to establish a session with connection server 130. Once the session is established, an interface similar to what is illustrated in FIG. 4A or FIG. 4B is provided on demonstration computer 260. If presenter 310 maximizes a window included in this interface, the maximized window will similarly the maximized in the interfaces provided to remote participants 140. Thus, if presenter 310 wishes to focus on a particular portion of the presentation, such as a demonstration being executed on demonstration computer 260, it may be done via this interface on the demonstration computer 260.

Fourth, demonstration computer 260 is programmed for the execution of demonstrations by presenter 310. For example, in an example where a presentation regarding the use of Microsoft Word is being made, demonstration computer 260 is programmed to execute Microsoft Word, and further includes in its storage various documents and data which are used by presenter 310 in conjunction with the presentation. In some instances, the demonstration may be provided by use of virtual machine software such as VMware Fusion (by VMware, Inc. of Palo Alto, Calif.). The use of virtual machine software allows the use of system images, which quickly provide presenter 310 with specific preset program environments ideal for demonstration purposes. Usually when demonstration computer 260 is being used to execute a demonstration, video switch 270 is configured to output the video signal received from demonstration computer 260, so that the demonstration is displayed on right display 220b and transmitted to connection server 130 via right video encoding system 230b.

Fifth, demonstration computer 260 is programmed to allow presenter 310 to observe the use of remote student computers 331. In some embodiments, presenter 310 can also control remote student computers 331. This allows presenter 310 to review and interact with remote use of remote student computers 331 without having to walk over to remote student computers 331. In some embodiments, "headless" configurations of remote student computers 331, in which no monitor, keyboard, or mouse is provided for student computers 331, may be used, as both presenter 310 and remote participant 140 are able to access student computers 331 via a network connection. In some embodiments, remote student computers 331 may be provided in a location remote from presentation center 110, which may allow for increased efficiency in administration of a pool of student computers 331 provided for a plurality of presentations. In one embodiment, student computers 331 are programmed to execute a server program providing a graphical desktop sharing system such as the platform-independent Virtual Network Computing (VNC) protocol, allowing for remote access by a computer, such as demonstration computer 260, which is programmed to execute a VNC client, such the open source program UltraVNC. Additionally, connection controller 290 may be programmed to provide a user interface that simplifies establishing a VNC session with any of the student computers 331 participating in a presentation. One example of such a user interface includes, but is not limited to, a set of icons that each correspond to a respective student computer 331. In some embodiments, the remote access mechanism provided for remote student computers 331 may also be provided for student computers 330, to facilitate access and control of these systems by presenter 310.

Video encoding systems 230a and 230b and demonstration computer 260 each have network connections to network 120. Various networking technologies, including, but not limited to, hard-wired connections such as CAT-5 Ethernet and wireless networking technologies such as 802.11g, may be employed. Via network 120 video encoding systems 230a and 230b and demonstration computer 260 exchange data with connection server 130, and thereby exchange data with remote participants 140a-140d. In the embodiment illustrated in FIG. 2A, it is optional for console interface 210 to make use of a network connection. However, various capabilities, such as control of the operation of the hybrid learning system or demonstration computer 260 directly from the console, make use of a network connection.

Figure 2B:
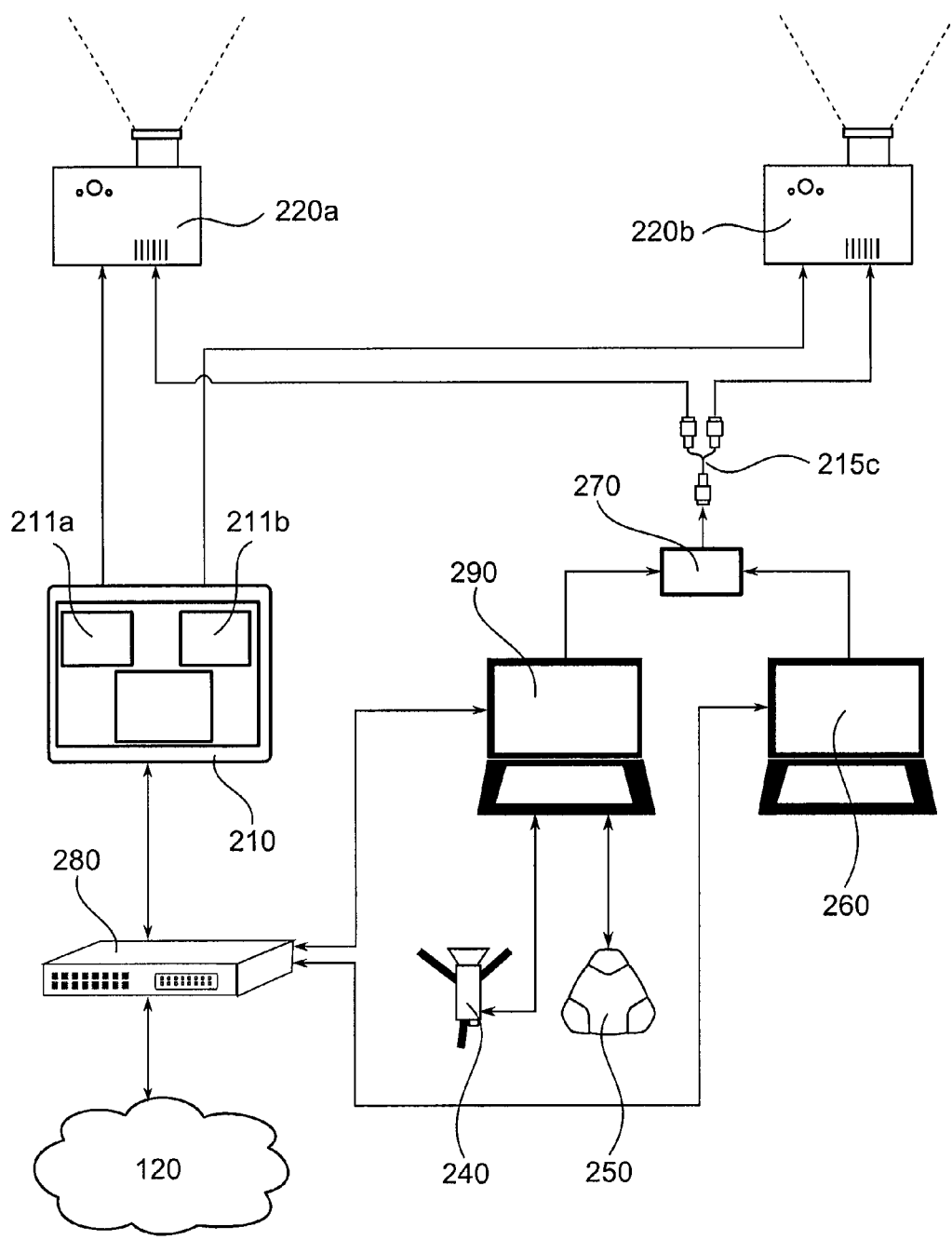
FIG. 2B illustrates a schematic of components included in another embodiment of presentation center 110.

FIG. 2B illustrates a schematic of components included in another embodiment of presentation center 110. In this embodiment, much as described above with respect to the embodiment illustrated in FIG. 2A, presenter 310 operates console interface 210, which includes two windows 211a and 211b for displaying left and right slides. The slide shown in left window 211a is directed to left display 220a, and the slide shown in left window 211b is directed to right display 220b.

In contrast to the embodiment illustrated in FIG. 2A, display signals output by console 210 are provided directly to displays 220a and 220b. However, display 220a and/or display 220b are capable of switching between at least 2 input display signals (FIG. 2B illustrates an embodiment in which both displays 220a and 220b are capable of switching between at least 2 input display signals). In the embodiment illustrated in FIG. 2B, displays 220a and 220b each also receive the display signal output by video switch 270. Usually, video switch 270 is configured to output the display signal received from demonstration computer 260. Accordingly, in the illustrated embodiment, each of displays 220a and 220b can selectively display the display signal it receives from console interface 210, demonstration computer 260, or connection controller 290. Thus, during the course of a presentation, one of displays 220a and 220b may display a slide from console interface 210, while the other display displays the display signal provided by demonstration computer 260, in order to more effectively demonstrate and explain the operation of software relating to the presentation. In some embodiments, selection of the display signal to display is performed by a manual interface on display 220a or display 220b or a handheld remote for display 220a or 220b. Also, although not illustrated in FIG. 2B, displays 220a and 220b may each be configured to receive only a single display signal, and implement display signal switching functionality via an external video switch 270.

In contrast to the embodiment illustrated in FIG. 2A, the embodiment illustrated in FIG. 2B does not include video encoding systems 230a and 230b. Instead, console interface 210 is connected to network 120 via network router 280. Network router 280 is an optional component in the embodiment illustrated in FIG. 2B, as one skilled in the art would appreciate console interface 210, connection controller 290, and demonstration computer 260 may be connected to network 120 in a different manner; however, the network topology including network router 280 is useful for improved networking speed among the network-connected devices included in FIG. 2B. Also, the embodiment illustrated in FIG. 2A can likewise be configured to include a network router 280. Via network 120, console interface 210 is programmed to provide the content of windows 211a and 211b to connection server 130. In one embodiment, console interface 210 is programmed to utilize Adobe Acrobat Connect software to establish two sessions with connection server 130, with the first session sharing the contents of window 211a and the second session sharing the contents of window 211b. This window content data is provided by connection server 130 to each of remote participants 140, such that the content of window 211a is displayed in window 410 of remote participant interface 400 and the content of window 211b is displayed in window 420 of remote participant interface 400 (see FIGS. 4A and 4B, described in more detail below). As the content of window 211a or window 211b changes during the course of a presentation, the updated content is reflected at the remote participants 140.

In the embodiment illustrated in FIG. 2B, demonstration computer 260 is programmed to perform the fourth function described with respect to demonstration computer 260 included in FIG. 2A: the execution of demonstrations by presenter 310. For example, in an example where a presentation regarding the use of Microsoft Word is being made, demonstration computer 260 is programmed to execute Microsoft Word, and further includes in its storage various documents and data which are used by presenter 310 in conjunction with the presentation. In some instances, the demonstration may be provided by use of virtual machine software such as VMware Fusion (by VMware, Inc. of Palo Alto, Calif.). The use of virtual machine software allows the use of system images, which quickly provide presenter 310 with specific preset program environments ideal for demonstration purposes. Usually when demonstration computer 260 is being used to execute a demonstration, video switch 270 is configured to output the video signal received from demonstration computer 260, so that the demonstration may be displayed on one or both of displays 220a and 220b. In contrast to the embodiment illustrated in FIG. 2A, demonstration computer 260 included in FIG. 2B is programmed to provide the content of its display or windows presented thereon to connection server 130. In one embodiment, demonstration computer 260 is programmed to utilize Adobe Acrobat Connect software to establish a session with connection server 130, with the session sharing the content of the desktop of a graphics-based operating system. This display content is provided by connection server 130 to each of the remote participants 140, such that the content of the display of demonstration computer 260 is displayed via remote participant interface 400. In that particular embodiment, the content of the display is not displayed in either of windows 410 or 420. Instead, connection controller 290 is programmed to allow presenter 310 to control remote participant interface 400 such that an additional demonstration window 499 is displayed on remote participant interface 400. For example, connection controller 290 may be programmed such that demonstration window 499 is usually positioned "off-screen, " so as to not be displayed as part of remote participant interface 400, but presenter 310 may perform a "drag an drop" operation that moves demonstration window 499 to position 499a illustrated in FIG. 4A, at which point it is made visible in remote participant interface 400. Further, presenter 310 may choose to maximize demonstration window 499 so as to occupy most or all of remote participant interface 400, and provide a more detailed view of the demonstration being performed on demonstration computer 260. In some embodiments, demonstration window 499 is positioned directly over additional information window 460 (the windows are stacked), and full screen button is displayed demonstration window 499 on remote participant interface 400, which allows a remote participant to toggle between a full screen view of demonstration window 499 to view a demonstration in more detail. This only affects the view for a remote participant 140 who clicks on the full screen button, and not the view presented to other remote participants 140. When performing a demonstration, presenter 310 verbally cues remote participants 140 to click the full screen button.

Connection controller 290 is programmed to perform a number of functions, many of which were described above with respect to demonstration computer 260 included in the embodiment illustrated in FIG. 2A. First, demonstration computer 260 receives streaming video from video camera 240. Connection computer 290 is programmed to compress and/or encode the high-bandwidth video data received from video camera 240 into a low-bandwidth video data stream suitable for transmission via network 120 and receipt by connection server 130. In some embodiments, video camera 240 is aimed in a fixed direction at a fixed zoom position, so as to provide streaming video of presenter 310 while presenter 310 is at console interface 210. However, in some embodiments, the direction and/or zoom of video camera 240 may be controlled via demonstration computer 260. This allows video camera 240 to be directed at other targets at the presentation site, such as local attendees 320 or presenter 310 while at positions other than console interface 210, such as while operating demonstration computer 260. In one embodiment, connection controller 290 is programmed to utilize Adobe Acrobat Connect software to establish a session with connection server 130 for sharing the video with connection server 130, with the video data transmitted via the session provided to remote participants 140.

Second, connection controller 290 outputs and receives audio via speakerphone 250. Connection controller 290 is programmed to compress and/or encode audio signals received from speakerphone 250 into an encoded digital format suitable for transmission via network 120 and receipt by connection server 130. Additionally, connection controller 290 is programmed to receive audio data from connection server 130 via network 120, process the received audio data, and output the audio via speakerphone 250. Accordingly, when presenter 310 speaks, speakerphone 250 captures the audio, demonstration computer 260 transmits audio data to connection server 130, and connection server 130 provides the audio data to remote participants 140, thereby allowing the remote participants to hear the presentation given by presenter 310. In circumstances where a remote participant is able to participate in a discussion during the presentation, speech captured by remote participant 140 is transmitted, via connection server 130, to connection controller 290 for output at the presentation site. In one embodiment, connection controller 290 is programmed to utilize Adobe Acrobat Connect software to establish a session with connection server 130 for transmitting audio data between connection controller 290 and connection server 130. Adobe Acrobat Connect software provides a camera and voice module that can be utilized to, with a single session between connection controller 290 and connection server 130, share both the video and audio data discussed above.

In some embodiments, instead of speakerphone 250, one or more microphones and one or more speakers may be provided, particularly at a site frequently used in conjunction with the disclosed subject matter. The use of more than one microphone may better allow audio conversations by local attendees 320 to be captured. The use of one or more speakers may better ensure each of local attendees 320 is able to hear audio output by connection controller 290.

Third, connection controller 290 is programmed to control interaction between presentation center 110 and connection server 130, as well as control how the presentation is viewed by remote attendees 141. Connection controller 290 is used to establish a session with connection server 130. Once the session is established, an interface similar to what is illustrated in FIG. 4A or FIG. 4B is provided on connection controller 290. If presenter 310 maximizes a window included in this interface, the maximized window will similarly the maximized in the interfaces provided to remote participants 140. Thus, if presenter 310 wishes to focus on a particular portion of the presentation, such as a demonstration being executed on demonstration computer 260, it may be done via this interface on connection controller 290.

Fourth, connection controller 290 is programmed to allow presenter 310 to observe the use of remote student computers 331. In some embodiments, presenter 310 can also control remote student computers 331. This allows presenter 310 to review and interact with remote use of remote student computers 331 without having to walk over to remote student computers 331. In some embodiments, "headless" configurations of remote student computers 331, in which no monitor, keyboard, or mouse is provided for student computers 331, may be used, as both presenter 310 and remote participant 140 are able to access student computers 331 via a network connection. In some embodiments, remote student computers 331 may be provided in a location remote from presentation center 110, which may allow for increased efficiency in administration of a pool of student computers 331 provided for a plurality of presentations. In one embodiment, student computers 331 are programmed to execute a server providing a graphical desktop sharing system such as the platform-independent Virtual Network Computing (VNC) protocol, allowing for remote access by a computer, such as connection controller 290, which is programmed to execute a VNC client, such the open source program UltraVNC. Additionally, connection controller 290 may be programmed to provide a user interface that simplifies establishing a VNC session with any of the student computers 331 participating in a presentation. One example of such a user interface includes, but is not limited to, a set of icons that each correspond to a respective student computer 331. In some embodiments, the remote access mechanism provided for remote student computers 331 may also be provided for student computers 330, to facilitate access and control of these systems by presenter 310.

Additionally, the functionality described for any of console interface 210, demonstration computer 260, and connection controller 290 may be combined into a single programmed computer system. For example, the functionality of demonstration computer 260 and connection controller 290 may be combined, thereby eliminating the need to utilize video switch 270. In another example, the functionality of all three systems may be combined into console interface 210. Depending on how console interface 210 is programmed to generate display signals, a third display signal out may be provided.

FIG. 3 illustrates an in-classroom arrangement for an embodiment of presentation center 110 including components illustrated in FIG. 2A. Networking and other data connections between the illustrated components are omitted from FIG. 3 to simplify its presentation, but these connections are readily understood and implemented by those skilled in the art based on this description, which expressly describes many of these connections. FIG. 3 merely illustrates an embodiment of the disclosed subject matter, and other in-classroom arrangements may be employed in accordance with the disclosed subject matter. Although terms such as "classroom," "in-class," and "out-of-class" are employed in this description, other locations including, but not limited to, lecture halls and meeting rooms can also be employed.

At the front of the classroom, presenter 310 is located near and operates console interface 210, with displays 220a and 220b positioned behind at to each side of presenter 310. Thus, in-class attendees 320 and video camera 240 can view presenter 310 and the presented materials at the front of the classroom. Speakerphone 250 is located near presenter 310 to ensure that speaking by presenter 310 is captured, and that any incoming audio, such as comments from remote attendees 141, may be heard by presenter 310. It is also helpful if incoming audio can be heard by in-class participants 320 and that speakerphone 250 can capture spoken comments by in-class participants 320, thereby allowing remote participants 140 to more fully participate in in-class discussions during the presentation. Also at the front of the classroom is demonstration computer 260, which allows presenter 310 to readily perform demonstrations and control interaction between presentation center 110 and connection server 130, as well as control how the presentation is viewed by remote attendees 141. Video encoding systems 230a are also located at the front of the classroom, as this location places them near displays 220a and 220b.

A plurality of in-class attendees 320 are seated in the classroom, with each in-class attendee having access to an in-class student system 330. FIG. 3 illustrates an arrangement in which two in-class attendees 320 share each in-class student system 330. However, other arrangements, such as where each in-class student system has a single corresponding in-class attendee 320, may be used, depending on the material being presented. In-class student systems 330 are programmed to provide a software environment suitable for in-class attendees to perform exercises associated with the presentation. For example, if the presentation relates to the use of Microsoft Word, in-class student systems 330 would be configured to execute Microsoft Word, and would include various example documents relating to the presentation. Virtual machine software, such as VMware Fusion, may be utilized to provide specific present program environments, in order to quickly provide particular configurations for use by in-class attendees 320. In-class systems 330 may be programmed to execute a server program providing a graphical desktop sharing system such as the VNC protocol, allowing for remote access by a computer, such as demonstration computer 260. In some embodiments, in-class systems 330 are connected to a data network.

In addition to in-class student systems 330, there is a plurality of out-of-class student systems 331 located in the classroom, which are programmed to provide the same software environment provided by in-class student systems 331. However, each out-of-class computer system 331 is further programmed to provide the content of its display or windows presented thereon to connection server 130, as well as allow remote control of out-of-class computer system 331 via connection server 130. In one embodiment, out-of-class student systems 331 are programmed to utilize Adobe Acrobat Connect software to each establish a separate session with connection server 130. Other techniques, such as the use of VNC or other remote desktop software may be utilized, as would be appreciated by those skilled in the art. These sessions not only share display contents, but further allows control of in-class student systems 331 via remote attendee systems 141, such that, for example, keyboard and mouse actions can be performed remotely on in-class student systems 331. Each remote attendee 141 utilizes their remote attendee system 140 to connect to an out-of-class student system 331, typically such that only one remote attendee 140 is connected to each out-of-class system 331. This allows a remote attendee 141 to perform, via remote attendee system 140, the same exercises associated with the presentation as in-class attendees 320. Out-of-class systems 331 may be programmed to execute a server program providing a graphical desktop sharing system such as the VNC protocol, allowing for remote access by a computer, such as demonstration computer 260. In some embodiments, out-of-class computers 331 include a display, keyboard, and mouse, which allows presenter 310 to review use of an out-of-class computer 331 by a remote attendee 141, and also operate software provided by out-of-class system 331 to demonstrate and explain an exercise to remote attendee 141. Out-of-class computers 331 allow presenter 310 to observe how remote attendees 141 are performing exercises and coach them, much as presenter 310 is able to do with respect to the use of in-class computers 330 by in-class attendees 320. In some embodiments, there is one remote attendee 141 assigned to a given out-of-class computer 331. In some embodiments, an out-of-class computer 331 is shared between two remote users 141, who can collaborate on exercises. In some embodiments, separate out-of-class student systems 331 are not provided, but instead in-class student systems 330 are programmed to be used remotely by remote attendees 141, and to provide voice communication between in-class student systems 330 and remote attendee systems 140. In this way, each remote attendee 141 may collaborate with an in-class attendee 320 by sharing an in-class student system 330.

Video camera 240 is located at the rear of the classroom. Typically, a wide angle shot is used, which captures presenter 310 and some of in-class attendees 320. Other uses of video camera 240, and in some embodiments a second video camera, are described in this disclosure.

FIG. 4A illustrates various windows included in an interface utilized by an embodiment of the disclosed subject matter. In advance of a presentation, connection server 130 is programmed to provide sessions that utilize user interface 400. On systems included in presentation center 110, such as demonstration computer 260 and connection controller 290, presenter 310 establishes sessions with connection server 130 that provide the interface illustrated in FIG. 4. Using this interface, presenter 310 is able to share display, video, and audio data with connection server 130 for presentation via remote attendee systems 140. Additionally, presenter 310 is able to perform "live" rearrangement and control operations for user interface 400 as it is displayed on remote attendee systems 140. For example, demonstration window 499, which ordinarily is outside of user interface 400, and thus not presented to remote attendees 141, may be dragged into user interface 400 at position 499a. This would cause demonstration window to be presented, along with other portions of user interface 400, on remote attendee systems 140. Further, presenter 310 may then maximize demonstration window 499, so as to provide a full-screen display of the content of demonstration window 490. Presenter 310 can control other windows included in user interface 400, such as moving, resizing, and deleting windows, with such changes being reflected on user interface 400 as it is presented via remote attendee system 140.

On remote attendee system 140, when a session is established with connection server 130, user interface 140 is presented via remote attendee system 140 to remote attendee 141. In one embodiment, remote attendee system 140 is programmed to provide user interface 400 via Adobe Acrobat Connect software. Typically, user interface 400 on remote attendee system 140 does not provide the same degree of control as the interface provided to presenter 310. For example, user interface 400 on remote attendee system may not allow remote attendee 141 to resize, move, maximize, or close windows included in user interface 400. However, remote attendee 141 is able to interact with, rather than merely observe, the presentation provided by presentation center 110 via user interface 400, as discussed in more detail below with respect to the windows included in user interface 400.

FIG. 4B illustrates another embodiment of user interface 400. Similar windows are included as those illustrated in FIG. 4A. Demonstration window 499 is included in user interface 400. Most of the time demonstration window 499 occupies limited space. However, when presenter 310 is performing a demonstration of demonstration computer 260, presenter 310 and/or remote attendee 140 can enlarge demonstration window 499 to allow viewing of its content in greater detail. For example, demonstration window 499 may be enlarged to provide a fullscreen display. Additionally, user interface 400 includes technical support window 422, allowing a user to receive support from within user interface 400 without interrupting participation in a presentation.

Figure 5A:
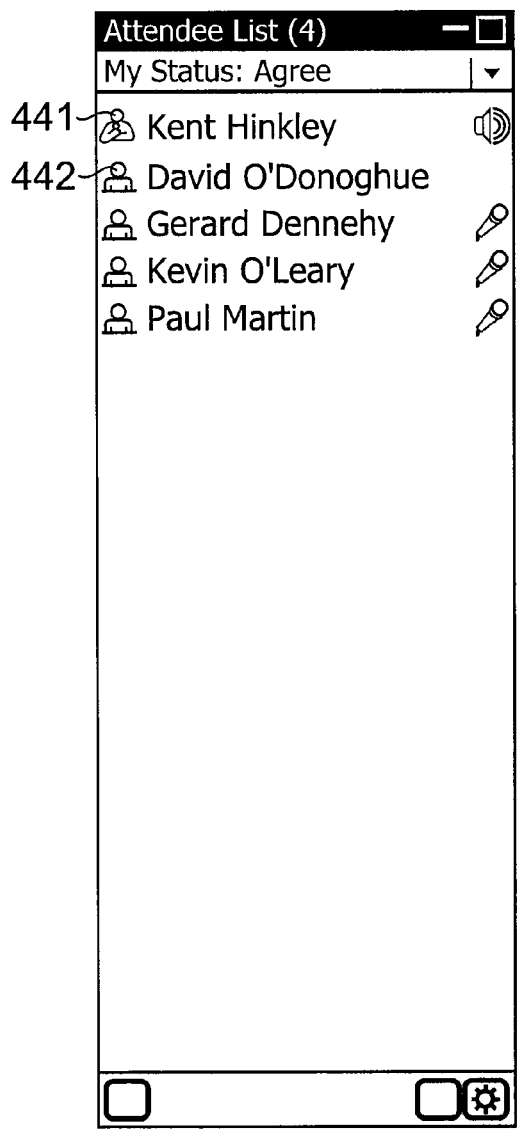
FIG. 5A illustrates an embodiment of attendee list window 440 included in user interface 400.

FIG. 5A illustrates an embodiment of attendee list window 440 included in user interface 400. Attendee list window 440 displays presenter 310 and remote attendees 140, providing their respective names and one or more icons denoting their respective role and status. Icon 441 indicates which participant is the presenter. Icon 442 indicates which participants are remote attendees 140. Status icons may further be provided which indicate, for example, a request from a remote attendee 140 for presenter 310 to speak louder, or a request from a remote attendee 140 for presenter 310 to speak softer. Presenter 310, via attendee list window 440, is able to clear the status icons.

Figure 5B:
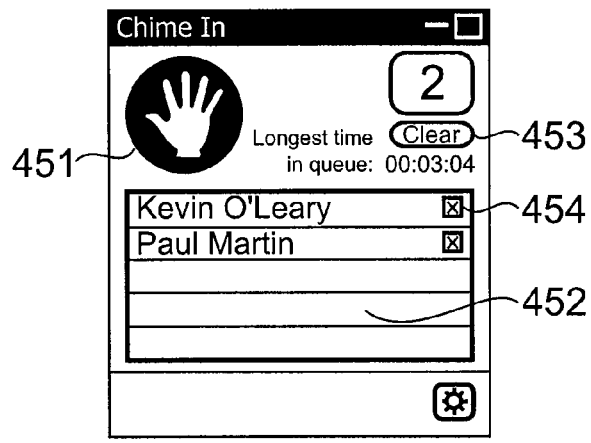
FIG. 5B illustrates an embodiment of chime-in interface 450 included in user interface 400.

FIG. 5B illustrates an embodiment of chime-in interface 450 included in user interface 400. By clicking chime-in button 451, remote attendee 140 is able to indicate that they have a question. When a remote participant 140 clicks chime-in button 451, their name is displayed in queue display 452, and is visible to presenter 310 and other remote participants 140. Also, in some embodiments this results in a chime sound being played at presentation center 110, to get the attention of presenter 310. Presenter 310 can clear the entire queue by clicking on clear button 453, or clear remote participant 140 from the queue by clicking confirm button 454 next to their name. A remote participant 140 may also clear themselves from the queue by clicking confirm button 454 next to their own name (confirm button 454 is only available to a remote participant 140 next to their own name, and not other remote participants 140). A remote participant 140 may only be listed in the queue once, even if the remote participant 140 clicks chime-in button 451 repeatedly, although there can be any number of remote participants 140 listed in the queue.

Figure 5C:
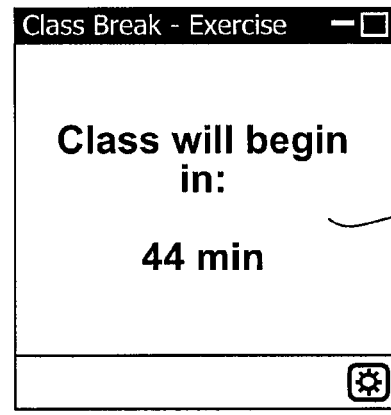
FIG. 5C illustrates an embodiment of additional information window 460 included in user interface 400.

FIG. 5C illustrates an embodiment of additional information window 460 included in user interface 400. Via display area 461, presenter 310 is able to display images and text that is displayed to remote attendees 140 via additional information window 460. For example, additional information window 460 may be used to display an amount of time remaining in a break period between portions of a presentation.

FIG. 5D illustrates an embodiment of left display window 410 included in user interface 400. A similar interface is included in user interface 400 for right display window 420. In one embodiment, presentation center 110 utilizes an Adobe Acrobat Connect session with connection server 130 to share the content of left display 220a, and utilizes an Adobe Acrobat Connect session with connection server 130 to share the content of right display 220b. On remote attendee system 140, the shared content of left display 220a is displayed in display area 411 of left display window 410, and the shared content of right display 220b is likewise displayed in right display window 420. Both presenter 310 and remote attendee 141 are provided with zoom tool 412, which allows adjusting the size of left display window 410, so as to, for example, display the shared content at the full size of user interface 400 to allow remote attendee 141 to view it in greater detail, or at the original size illustrated in FIG. 4A, while scaling the size of the displayed shared content appropriately. Presenter 310 is further provided with settings button 413, which allows presenter 310 to control various display settings. As illustrated in FIG. 5D, presenter 310 is able to add annotations via console interface 210 in real time during a presentation, to emphasize or more fully discuss materials. These annotations, when made visible for display via display 220a or 220b, are also displayed at remote attendee systems 140.

Figure 5E:
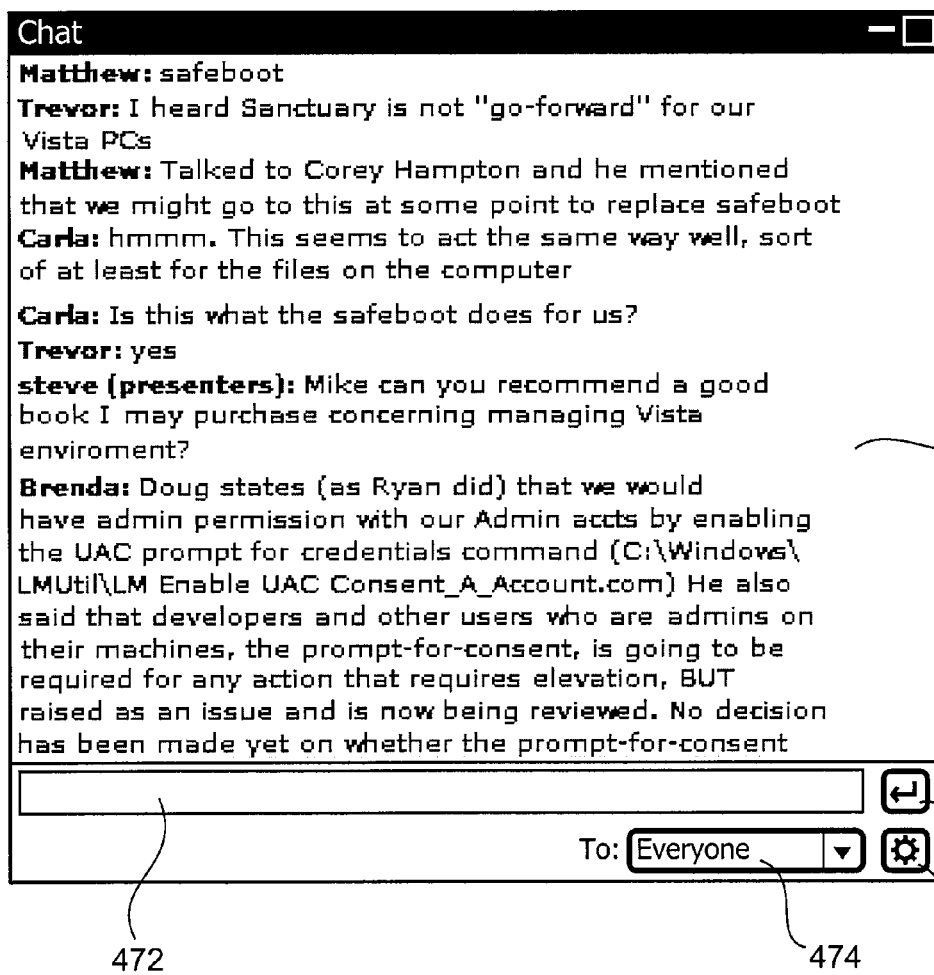
FIG. 5E illustrates an embodiment of chat window 470 included in user interface 400.

FIG. 5E illustrates an embodiment of chat window 470 included in user interface 400. Chat window 470 can be used to send a text message to a single attendee, or all attendees. Upon receipt of a text message, chat window 470 displays the sender's name and message in display area 471. To send a text message, one types the message into message area 472, selects a recipient via recipient control 474, and sends the message by clicking on send button 473. Additionally, presenter 310 is provided with settings button 475, which allows presenter 310 to control various display settings and preserve the chat history.

Figures 1, 5F:
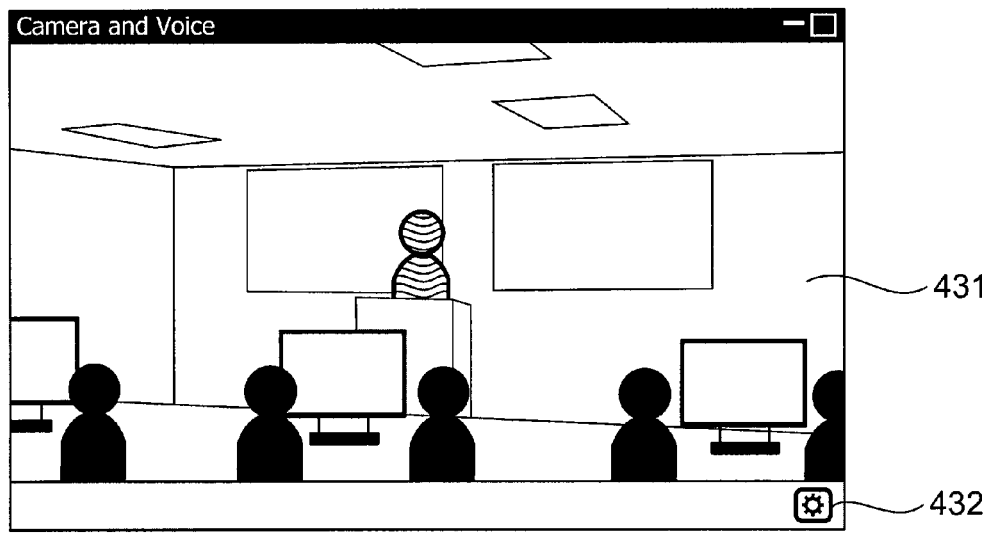
Figures 2, 5F:
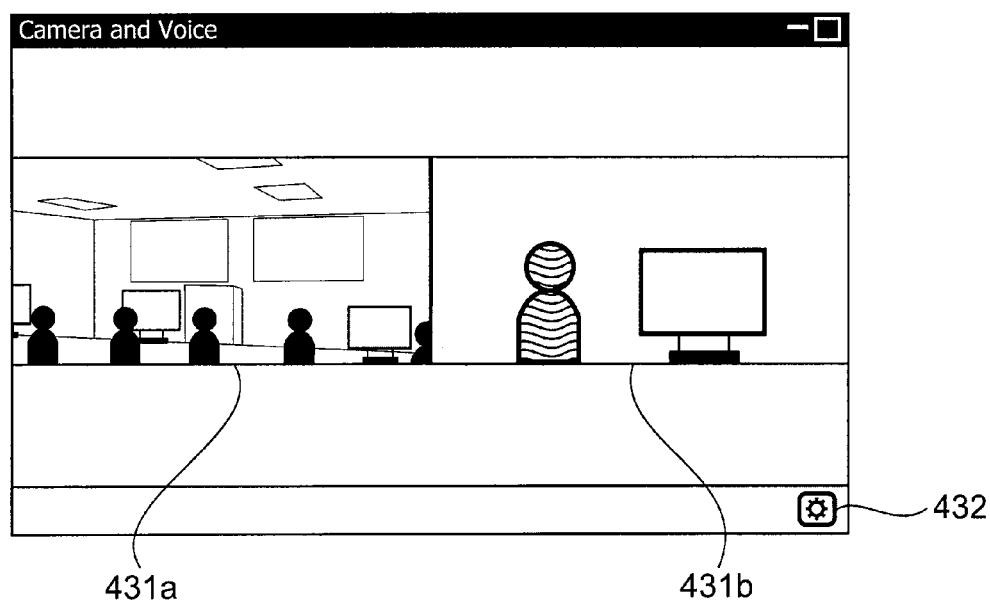
Figures 3, 5F:
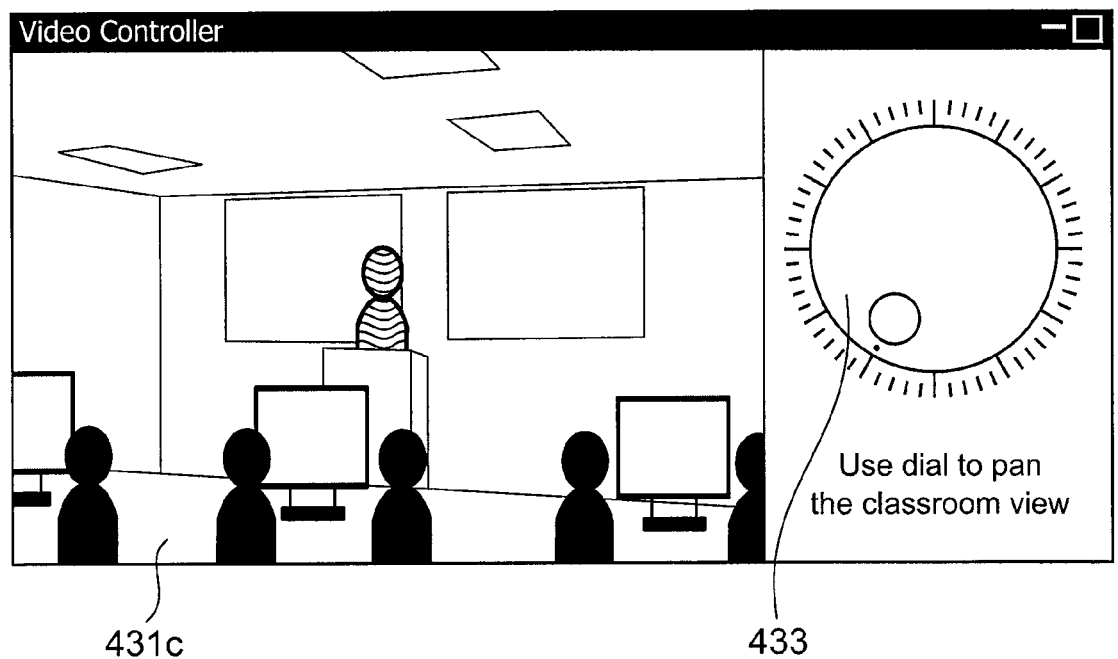

FIG. 5F illustrates an embodiment of audio/video window 430 included in user interface 400. In one embodiment, presentation center 110 utilizes an Adobe Acrobat Connect session to share video data captured via video camera 240 and audio data captured via speakerphone 250, as well as receive audio data provided via remote attendee systems 140. User interface 400 allows presenter 310 to adjust the size and location of audio/video window 430 within user interface 400, and also provides settings button 432, which allows presenter 310 to control various display settings. On remote attendee system 140, the shared video data is displayed in display area 431 of audio/video window 430, allowing remote attendee 141 to view the actions of presenter 310 and in-class attendees 320, depending upon what is captured by video camera 240.

Figure 5G:
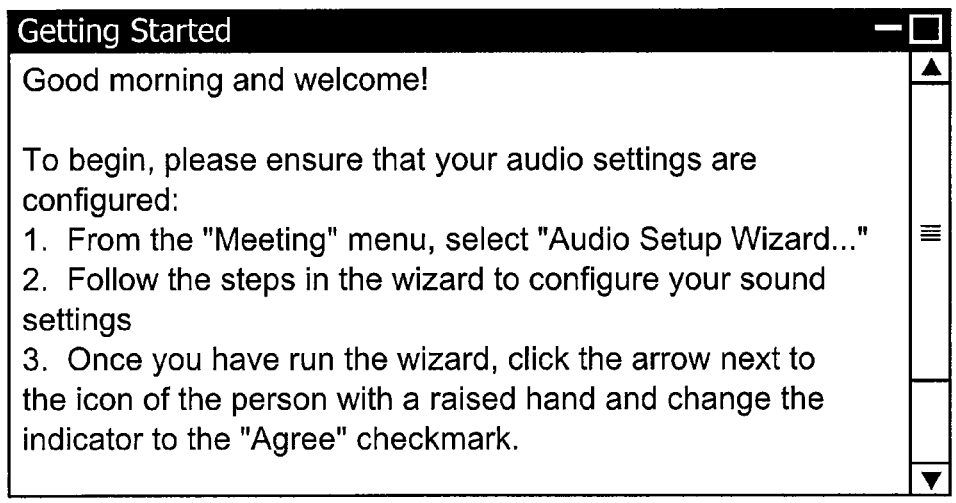
FIG. 5G illustrates an embodiment of getting started window 480 included in user interface 400.

FIG. 5G illustrates an embodiment of getting started window 480 included in user interface 400. In the embodiment illustrated in FIG. 4A, getting started window 480 provides a set of instructions that addresses common issues that arise for remote participants 141 seeking to participate in a presentation, such as establishing an audio connection. In FIG. 4B, technical support window 422 is instead provided.

Figure 5H:
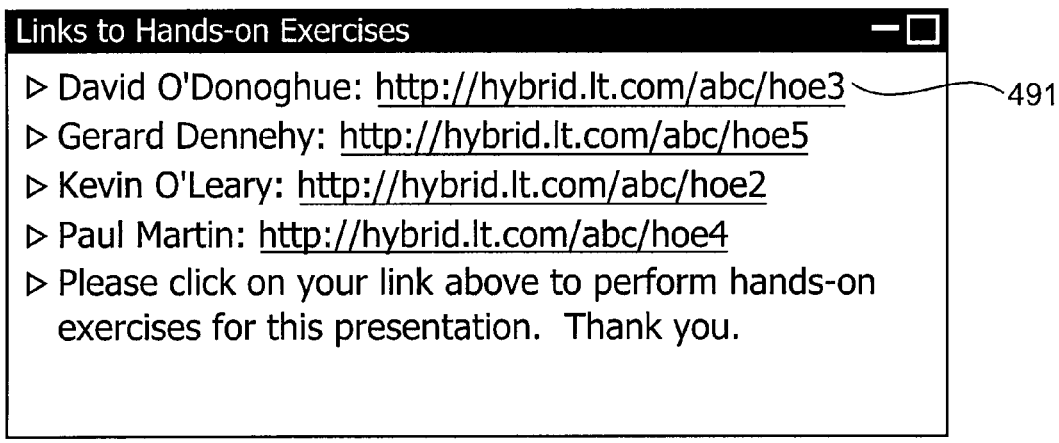
FIG. 5H illustrates an embodiment of web links window 490 included in user interface 400.

FIG. 5H illustrates an embodiment of web links window 490 included in user interface 400. Presenter 310 can provide various links 491 which, when clicked, direct a web browser or other application to content related to a presentation. In some embodiments, web links window 490 provides links to hands-on exercises for each remote attendee 141. By clicking on the correct link 491, remote attendee system 140 established a session with an out-of-class computer 331 for performing exercises. By providing this link 491 in web links window 490, remote attendee 141 can ready connect to the correct out-of-class computer 331 throughout a presentation.

Figures 1, 5I:
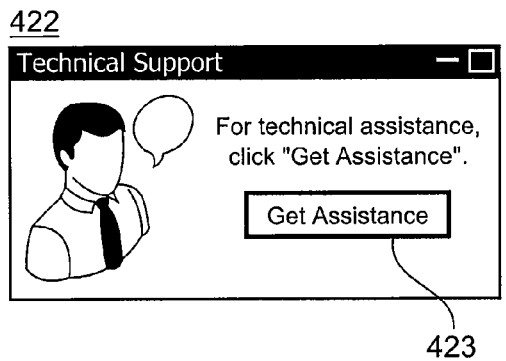
Figures 2, 5I:
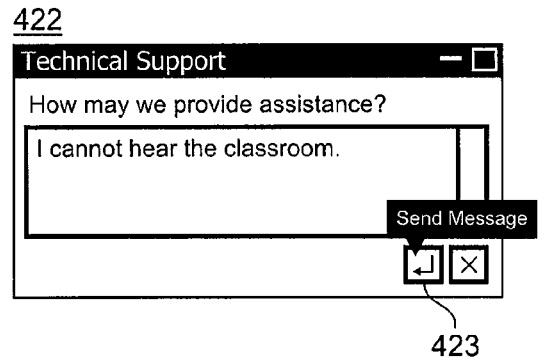
Figures 3, 5I:
Figures 4, 5I:
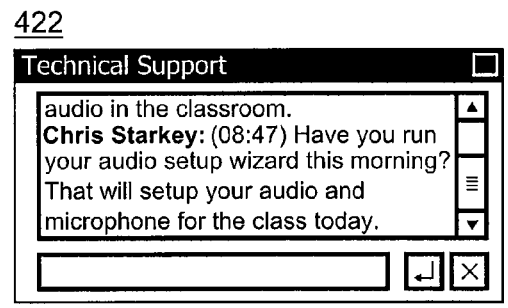

FIGS. 5I-1, 5I-2, 5I-3, and 5I-4 illustrate an embodiment of technical support window 422 included in user interface 400. Technical support window 422 allows any of remote participants 140 and presenter 310 to receive support from within user interface 400 without interrupting participation in a presentation. FIG. 5I-1 illustrates an initial view for technical support window 422. Assistance button 423 is clicked to receive support. Once assistance button 423 is clicked, technical support window 422 presents the view illustrated in FIG. 5I-2. The user enters brief description of the problem, and clicks submit button 424. Then, technical support window 422 presents the view illustrated in FIG. 5I-3 until a technical support representative is available to provide assistance. Once the technical support representative is available, technical support window presents the view illustrated, in which the user is able to conduct a chat session with the technical support representative. The technical support representative can also enter the virtual classroom to provide assistance directly. In some embodiments, technical support window 422 is positioned over additional information window 460 in FIG. 4.

Figure 6:
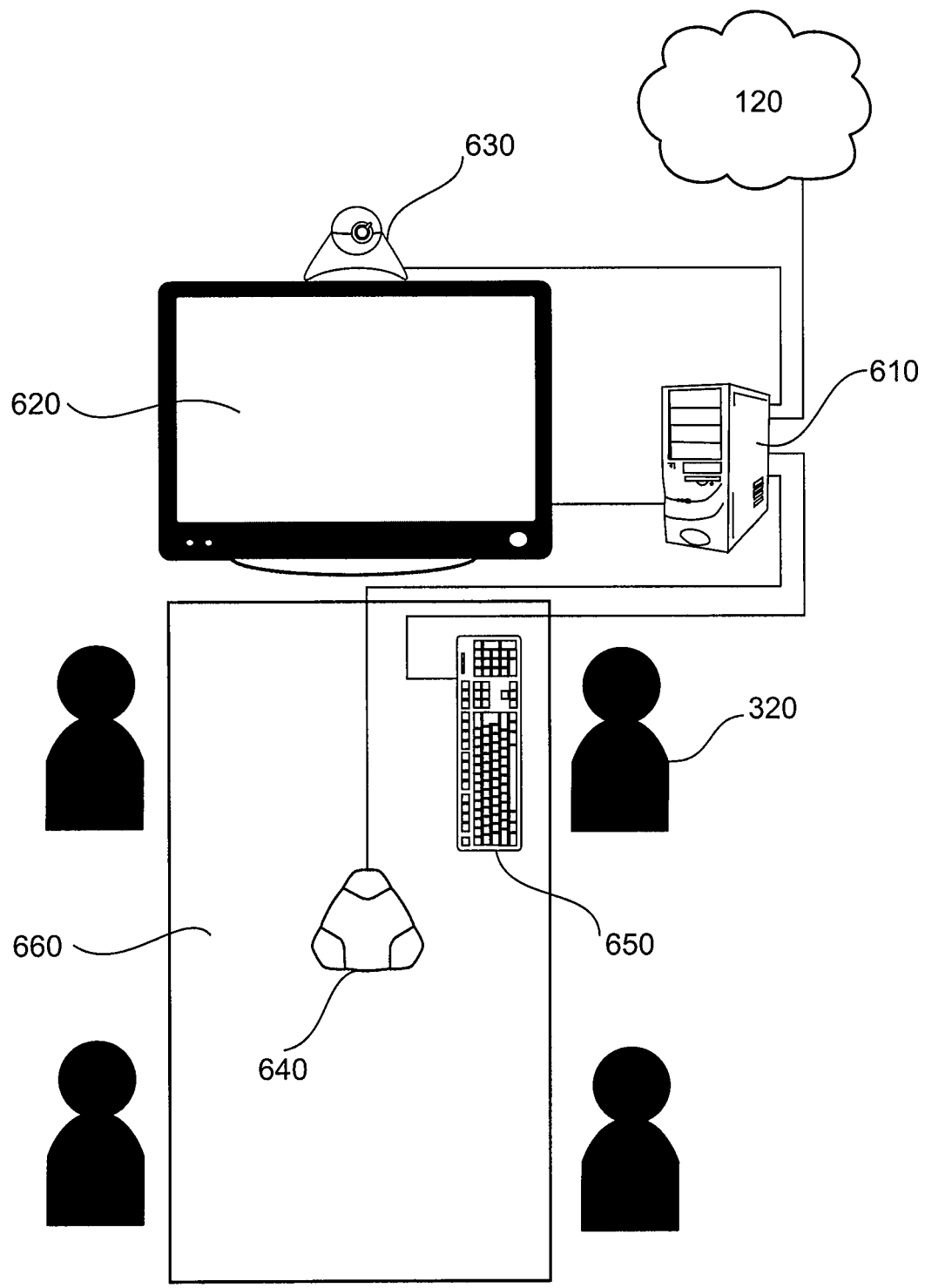
FIG. 6 illustrates an embodiment of a breakout session configuration 600.

FIG. 6 illustrates an embodiment of a breakout session configuration 600. In a breakout session, a subset of the in-class attendees 320 and a subset of the remote attendees 141 are assigned into a group to collaborate on a specific task or exercise. In some embodiments, each of these groups goes to a separate room to reduce noise and distractions, each room being provided with breakout session configuration 600 illustrated in FIG. 6. In some embodiments, a plurality of breakout session configurations 600 are provided in a single room, and may, in some embodiments, be provided in the same room in which the associated presentation is being held. Breakout session configuration 600 includes breakout computer system 610, which is connected to network 120, camera 630, display 620, speakerphone 640, and input device 650. Breakout computer system 610 is programmed to receive video data from camera 630 and receive audio data from speakerphone 640, and then compress and/or encode the received video and audio data into a low-bandwidth outgoing data stream suitable for transmission via network 120 for receipt and/or retransmission to the remote attendee systems 140 participating in the breakout session associated with breakout computer system 610. An example of camera 630 includes, but is not limited to, the Microsoft LifeCam VX-7000 USB webcam (from Microsoft of Redmond, Wash.). An example of speakerphone 640 includes, but is not limited to, the Chat 150 VC Video Conference Speakerphone (by ClearOne Communications of Salt Lake City, Utah). As appreciated by those skilled in the art, other equipment and techniques for receiving and outputting audio and video is well known, and readily utilized. Camera 630 is positioned to capture video of in-class attendees 320 participating in the breakout session, to facilitate more effective collaboration. Remote attendee systems 140 are programmed to receive the outgoing data stream, and display the video captured via camera 630 and output the audio captured via speakerphone 640. Breakout computer system 610 is also programmed to receive and output via speaker phone 640 audio data received from remote attendee systems 140, such as speech communications from remote attendees 141. Remote attendee systems 140 are programmed to capture audio data, such as speech communications from remote attendee 141, and compress and/or encode the audio data for receipt by breakout computer system 610. In some embodiments remote attendees 141 may utilize headsets for incoming and outgoing audio, but a microphone and speaker are also suitable. In some embodiments, remote attendee systems 140 may be programmed to provide and/or respond to an audio control that selectively enables the transmission of audio from remote attendee system 140 to breakout computer system 610. For example, a talk/mute button (not shown) may be provided by remote attendee system 140.

Display 620, in some embodiments, is a large format display for use by in-class participants 320. An example of display 620 includes, but is not limited to, a 47-inch 1080p LCD television with a video input such as VGA, DVI, or HDMI. Breakout computer system 610 is configured to output on display 620 breakout interface 700, which is described in more detail below. Input device 650 allows for in-class attendees 320, or someone concerned with setting up breakout computer system 610, to control breakout computer system 610. Input device 650 may include, for example, a keyboard and a mouse. In some embodiments, some or all of the components included in breakout session configuration 600 are on a table 660, around which in-class attendees 320 are seated.

Breakout computer system 610 may be programmed to allow remote access by presenter 310, for the purpose of assisting with or reviewing the progress of the breakout session. For example, breakout computer system 610 may provide a Virtual Network Computing (VNC) server.

Figure 7:
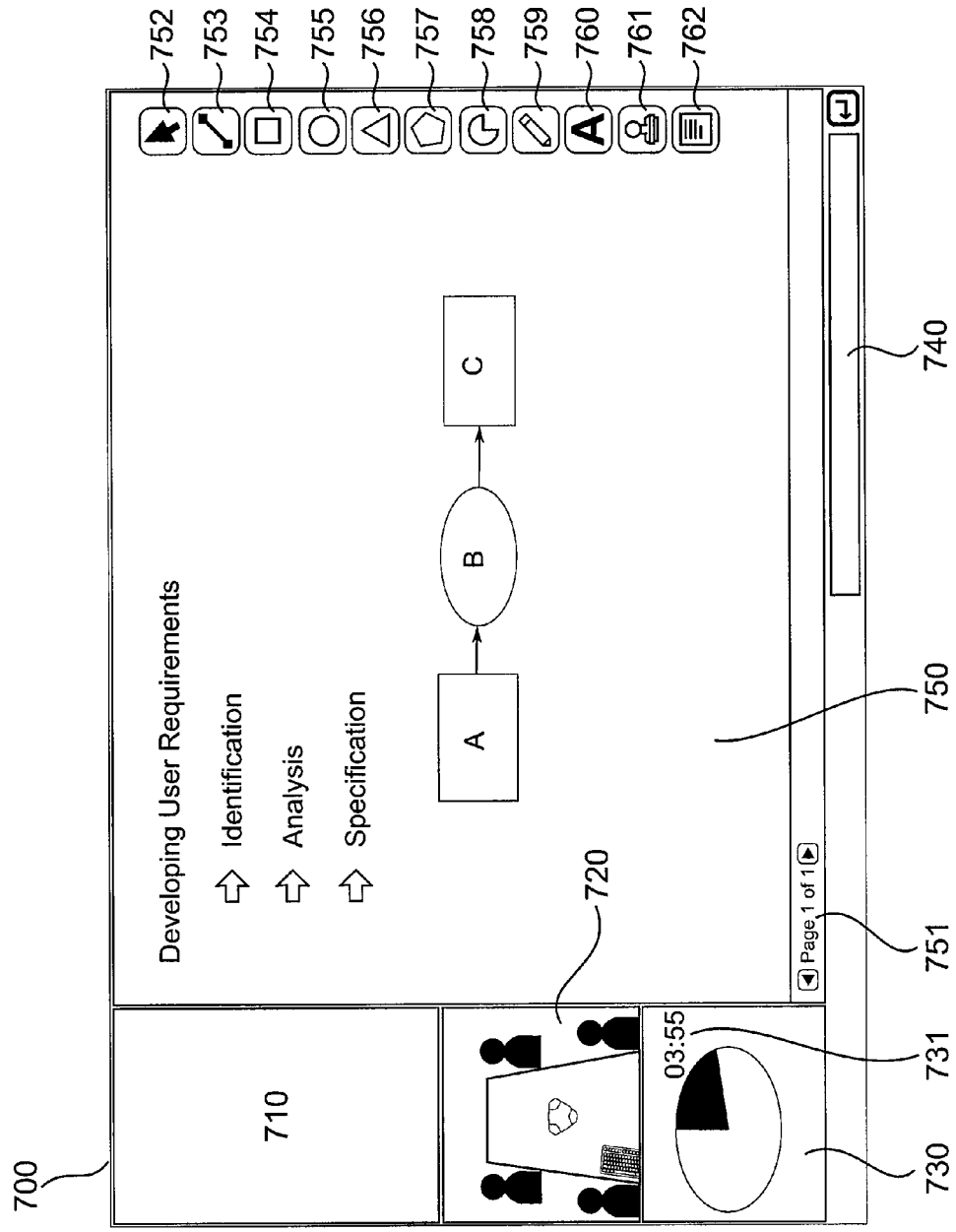
FIG. 7 illustrates an embodiment of a breakout interface 700 utilized during the breakout sessions.

FIG. 7 illustrates an embodiment of a breakout interface 700 utilized during the breakout sessions described above. Breakout interface 700 is provided on display 620 and remote attendee systems 140 during a breakout session. Breakout interface 700 includes attendee list window 710. Attendee list window 710 works in much the same manner described above with respect to attendee list window 440 includes in user interface 400. However, for a breakout session, the only remote attendees 141 listed are those participating in the breakout session. Other remote attendees 141 way be participating in the same class, but assigned to different breakout sessions. Audio/video window 720 works in much the same manner described above with respect to audio/video window 430. Video data captured via camera 630 and audio data captured via speakerphone 640 and transmitted via network 120 is received by remote attendee system 140, which displays the video in audio/video window 720, and outputs the received audio data for remote attendee 141. Accordingly, remote attendee 141 can view and more effectively interact with the in-class attendees 320 participating in the same breakout session. Additional information window 730 provides other information to the attendees participating in the breakout session, such as the illustrated countdown timer 931, which displays the amount of time remaining in a breakout session period. Typically, breakout sessions are for a defined period of time, after which all of the attendees of a presentation return to the main meeting. In some embodiments, breakout interface 700 may also include a chat window (not illustrated), similar to chat window 470 discussed above, to allow attendees participating in the breakout session to exchange text messages. Broadcast message box 740 allows an attendee participating in the breakout session to send a message to presenter 310 if the group needs assistance. Presenter 310 can send a message to all attendees that is displayed via broadcast message box 740 or additional information window 730.

Whiteboard window 750, included in breakout interface 700, provides a collaborative tool that enables in-class attendees 420 (via input device 850) and remote attendees 141 (via remote attendee systems 140) to create and edit drawings and diagrams together. Whiteboard window 750 provides multiple virtual pages that are accessible to each of the attendees via page navigation control 751. The attendees may interact with whiteboard window 750 to draw shapes, diagrams, and notes. Whiteboard window 750 is particularly useful for management-type material, where attendees may break into small groups to brainstorm or draw flowcharts and other project management tracking charts or graphs. Changes made via breakout computer 610 or remote attendees systems 140 are reflected on the whiteboard windows 700 provided to each of the attendees of the breakout session. Whiteboard window 750 includes drawing tools such as, but not limited to, object selector 752 to grab and reposition objects; line tool 753 for creating straight lines; rectangle tool 754 for creating quadrilateral figures; oval tool 755 for creating circles and oval shapes; triangle tool 756 for creating trilateral figures; polygon tool 757 for creating multilateral figures; wedge tool 758 for creating semi-elliptical figures; pencil tool 759 for drawing free-form shapes; text tool 760 for creating and editing text; rubber stamp tool 761 for creating frequently-used shapes; and sticky-note tool 762 for creating and editing on-screen notes.

In some embodiments, remote attendee systems 140 are programmed to provide an interface that allows remote attendees 141 to switch between user interface 400 for the main meeting and breakout interface 700. For example, web links window 490 included in user interface 400 may provide to remote attendees 141 links that when clicked upon will start up breakout interface 700. Once the breakout session is complete, breakout interface 700 may be terminated, and remote attendee system 140 returns to user interface 400.

Once the breakout session is completed, and the attendees return to the main meeting, presenter 310 can display the results of the breakout sessions in the main classroom for a group debriefing. One of the attendees will normally speak to the results their group compiled in the breakout session. In the main classroom, the contents of whiteboard window 750 for each of the breakout sessions can be displayed to both the in-class attendees and the remote attendees for discussion.

In some embodiments, the breakout session features are provided utilizing Adobe Acrobat Connect software. In such embodiments, much as discussed above, connection server 130 is utilized between breakout computer system 610 and remote attendee systems 140. In some embodiments, Citrix GoToMeeting (by Citrix Online LLC of Goleta, Calif.) may be utilized to provide the breakout session features described above. Each breakout session utilizes a separate session, which is accessed by the breakout computer system 610 and remote attendee systems 140 associated with the breakout session.

Figure 8:
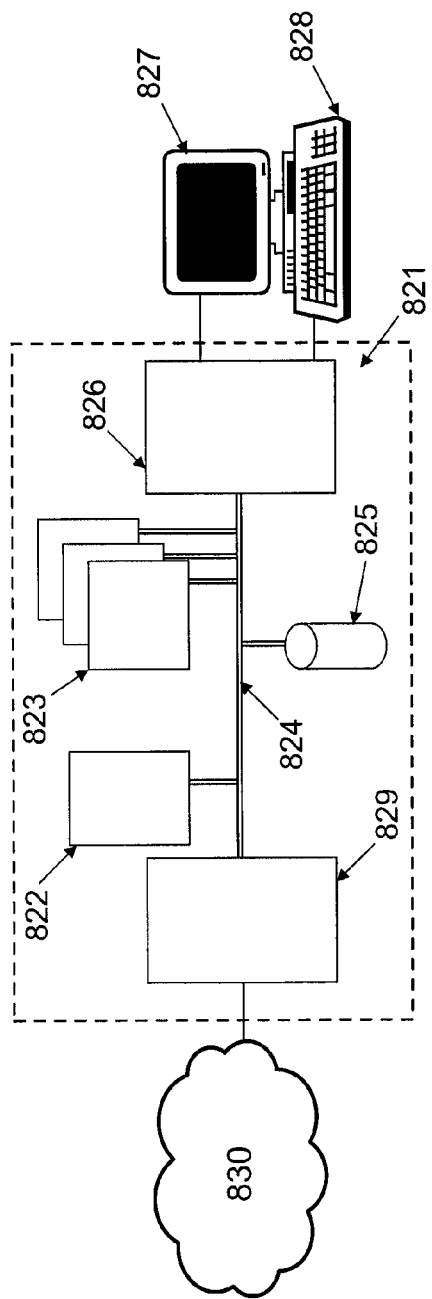
FIG. 8 is a functional block diagram of a PC based implementation of computer system 821, and is illustrative of some embodiments of various programmed computer systems illustrated in the figures.

FIG. 8 is a functional block diagram of a PC based implementation of computer system 821, and is illustrative of some embodiments of various programmed computer systems illustrated in the figures described above. The exemplary system 821 contains a central processing unit (CPU) 822, memories 823 and an interconnect bus 824. The CPU 622 may contain a single microprocessor (e.g. an x86 microprocessor), or it may contain a plurality of microprocessors for configuring the computer system 821 as a multi-processor system. The memories 823 include a main memory, such as a dynamic random access memory (DRAM), as well as a read only memory, such as a PROM, an EPROM, a FLASH-EPROM, or the like. The system 821 also includes mass storage devices such as various disk drives, tape drives, etc. The main memory typically includes dynamic random access memory (DRAM) and high-speed cache memory. In operation, the main memory stores at least portions of instructions and data for execution by the CPU 822.

The mass storage may include one or more magnetic disk or tape drives or optical disk drives, for storing data and instructions for use by CPU 822. For a user PC, for example, at least one mass storage system 825 in the form of a disk drive or tape drive, stores the operating system and application software as well as data, such as received messages and documents. The mass storage 825 within the computer system 821 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 821.

The system 821 also includes one or more input/output interfaces for communications, shown by way of example as an interface 829 for data communications via a network 830. The interface 829 may be a modem, an Ethernet card or any other appropriate data communications device, for digital communications of various types via network 830. The physical communication links may be optical, wired, or wireless (e.g., via satellite, cellular, or WLAN network).

The computer system 821 may further include appropriate input/output ports 826 for interconnection with a display 827 and a keyboard 828 serving as the respective user interface. For example, the computer may include a graphics subsystem to drive the output display 827. The output display 827 may include a cathode ray tube (CRT) display or liquid crystal display (LCD). The input control devices for such an implementation of the system 821 would include the keyboard 828 for inputting alphanumeric and other key information. The input control devices for the system may further include a cursor control device (not shown), such as a mouse, a trackball, stylus, or cursor direction keys. The links of the peripherals 827, 828 to the system 821 may be wired connections or use wireless communications.

Each computer system 821 runs a variety of applications programs and stores data, enabling one or more interactions via the user interface, provided through elements such as 827 and 828, and/or over network 830 to implement the desired processing for the inventory service or the processing of requests for inventory services.

Figure 9:
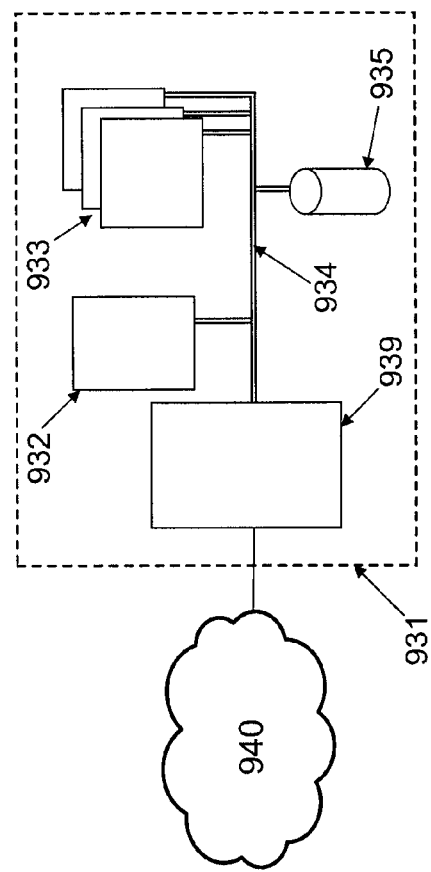
FIG. 9 is a functional block diagram of a general-purpose computer system 931, which may perform the functions of a server, and is illustrative of some embodiments of the programmed computer systems illustrated in the figures.

FIG. 9 is a functional block diagram of a general-purpose computer system 931, which may perform the functions of a server, and is illustrative of some embodiments of the programmed computer systems illustrated in the figures described above.

The exemplary computer system 931 contains a central processing unit (CPU) 932, memories 933 and an interconnect bus 934. The CPU 932 may contain a single microprocessor, or may contain a plurality of microprocessors for configuring the computer system 932 as a multi-processor system. Although not illustrated as such, computer system 931 may comprise a plurality of discrete computer systems, interconnected via data network 940. The memories 933 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 932.

The mass storage may include one or more magnetic disk or tape drives or optical disk drives, for storing data and instructions for use by CPU 932. At least one mass storage system 935, preferably in the form of a disk drive or tape drive, stores the database used for the inventory service. The mass storage 935 may also include one or more drives for various portable media, such as a floppy disk, a compact disc read only memory (CD-ROM), or an integrated circuit non-volatile memory adapter (e.g., a PC-MCIA or USB adapter) to input and output data and code to and from the computer system 931.

The system 931 also includes one or more input/output interfaces for communications, shown by way of example as an interface 939 for data communications via network 940. The interface 939 may be a modem, an Ethernet card or any other appropriate data communications device. To provide the inventory service to a large number of users, the interface 939 preferably provides a relatively high-speed link to network 940 The physical communication link may be optical, wired, or wireless (e.g., via satellite, cellular, or WLAN network). Alternatively, the computer system may comprise a mainframe or other type of host computer system.

Although not shown, the system 931 may further include appropriate input/output ports for interconnection with a local display and a keyboard or the like serving as a local user interface. Alternatively, the server operations personnel may interact with the system 931 for control and programming of the system from remote terminal devices via network 940.

The computer system 931 runs a variety of applications programs and stores the database. Those skilled in the art will recognize that the computer system 931 may run other programs and/or host other database services. As such, the system 931 need not sit idle while waiting for inventory service related functions. Also, the system 931 may be implemented as a single computer system or as a distributed system having multiple appearances at different nodes on network 940.

The components contained in the computer systems 921 and 931 are those typically found in general purpose computer systems used as servers, workstations, personal computers, network terminals, and the like. In fact, these components are intended to represent a broad category of such computer components that are well known in the art.

Aspects of the techniques outlined above may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the white point correction, etc. as shown and described herein. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer or other programmable device can read programming code and/or data. Many of these forms of computer or machine readable media may be involved in carrying one or more sequences of one or more instructions to a processor for execution.

Certain aspects of the invention relate to software elements, such as executable code and/or database software used to implement the various disclosed functions. These functions may reside on different physical systems, linked by local or wide area communications networks.

At different times all or portions of the executable code or database for any or all of these software elements may reside in storage media or be carried by electromagnetic media. The various data components as well as other files relating to the inventory system developed may reside in or be transported via a variety of different media. Physical media include the memory of the computer processing systems 621, 731, such as various semiconductor memories, tape drives, disc drives and the like of general-purpose computer systems. All or portions of the software may at times be communicated through via a network or various other telecommunication networks. Such communications, for example, may be to load the software from another computer (not shown) into a server or into another network element. Thus, another type of media that may bear the software elements includes optical, electrical and electromagnetic waves, such as used across physical interfaces between local devices, through wired and optical landline networks and over various air-links.

Hence, operations described above may be carried out by execution of software, firmware, or microcode operating on a router or computer of any type. Additionally, code for implementing such operations may be in the form of computer instruction in any form (e.g., source code, object code, interpreted code, etc.) stored in or carried by any computer or machine readable medium.

At different times all or portions of the executable code for any or all of these programming elements may reside in storage media or be carried by electromagnetic media. Storage media include the memory of the wireless controller or of memory or other storage elements of computer processing systems that may supply programming to the wireless controller, such as various semiconductor memories, tape drives, disc drives and the like. All or portions of the software may at times be communicated through the Internet or various other telecommunication networks. Such communications, for example, may be to load the software or an update thereof from a computer (not shown) into the wireless controller. Thus, another type of media that may bear the software elements includes optical, electrical and electromagnetic waves, such as used across physical interfaces between local devices, through wired and optical landline networks and over various air-links.

In this disclosure there are described only the preferred embodiments of the disclosed subject matter and but a few examples of its versatility. It is to be understood that the disclosed subject matter is capable of use in various other combinations and environments and is capable of changes or modifications within the scope of the inventive concepts expressed herein. Thus, for example, those skilled in the art will recognize, or be able to ascertain, using no more than routine experimentation, numerous equivalents to the specific substances and procedures described herein. Such equivalents are considered to be within the scope of this invention. Additionally, the scope of the inventive concepts includes both combinations and subcombinations of the various features described hereinabove, as well as variations and modifications thereof which would occur to persons skilled in the art upon reading the foregoing description.

The previous description and figures are provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public.

What is claimed is:

1. A system providing an electronic presentation, the system comprising:
a console interface of a console programmable computer configured to provide a presentation control interface for directing visual content to a presentation display for viewing by a plurality of in-class participants;
a camera configured to capture video data of a presenter;
a microphone configured to capture audio data of the presenter;
one or more programmable computers configured to receive image data from the camera, audio data from the microphone, and the visual content displayed on the presentation display, encode the image data, audio data, and visual content as outgoing data, and transmit the outgoing data to a plurality of remote attendee systems via a network, wherein the one or more programmable computers are further configured to receive incoming data from the plurality of remote attendee systems via the network, and in response to the incoming data, output audio via a speaker, and interact with the console programmable computer;
a plurality of in-class programmable systems located in a classroom, each comprising a display, input device, processor, and computer-readable memory, the computer-readable memory having instructions stored thereon to provide an educational exercise, the providing comprising:
executing learning software,
sending an educational exercise in the learning software to one or more of the plurality of in-class participants, and
receiving a response for the educational exercise;
a plurality of out-of-class programmable systems, located in the same classroom as the plurality of in-class programmable systems, each comprising a display, input device, processor, and computer-readable memory, the computer-readable memory having instructions stored thereon to provide the educational exercise as used in the in-class programmable systems, the providing comprising:
executing the learning software,
sending the educational exercise in the learning software to one or more of the plurality of remote attendee systems via a respective one or more of the plurality of out-of-class programmable systems via the network,
receiving a response for the educational exercise from the respective one or more of the plurality of out-of-class programmable systems for the educational exercise, wherein the plurality of out-of-class programmable systems are operated by a respective one of the plurality of remote attendee systems via the network;
a demonstration computer configured to execute demonstrations by the presenter and
a connection server configured to exchange data with the plurality of remote attendee systems over the network, wherein:

the demonstration computer is configured to compress high bandwidth video data into low bandwidth video data for transmission over the network through the connection server,
the demonstrations by the presenter are displayed on the presentation display for viewing by the in-class participants and are transmitted to the connection server to display the demonstrations on a remote participant interface of each remote attendee system over the network, and
each remote attendee system is configured to receive and display the demonstrations on a demonstration window of the remote participant interface of each remote attendee system.

2. The system of claim 1, wherein:
the presentation control interface is programmed to direct visual content to a plurality of presentation displays for viewing by the plurality of in-class participants; and
the system of claim 1 further comprises one or more display encoding systems configured to transmit the visual content presented on the plurality of presentation displays to the plurality of remote attendee systems through the connection server over the network.

3. The system of claim 1, further comprising:
a plurality of breakout programmable computer systems each comprising a breakout display, a breakout camera, a breakout microphone, a breakout speaker, and a breakout input device;
wherein each breakout programmable computer is programmed to:
provide a virtual whiteboard on the breakout display for displaying inputs entered via the breakout input device,
receive image data from the breakout camera and audio data from the breakout microphone,
encode the image data and audio data into outgoing breakout data, and transmit the outgoing breakout data to a subset of the plurality of remote attendee systems via the network,
transmit the inputs entered via the breakout input device to the subset of the plurality of remote attendee systems, and
receive encoded audio data from a remote attendee system included in the subset of the plurality of remote attendee systems, and output the received audio data via the breakout speaker.

4. The system of claim 1, wherein:
the one or more computers and the demonstration computer communicate with the plurality of remote attendee systems only through the connection server, and
the connection server broadcasts data received from the one or more computers or demonstration computer to the plurality of remote attendee systems.

5. The system of claim 3, wherein each breakout programmable computer is configured to allow remote access by the presenter for the purpose of assisting with or reviewing the progress of a breakout session.

6. The system of claim 3, wherein each breakout programmable computer is configured to display a breakout interface on the breakout display for a breakout session, and the breakout interface is displayed on a subset of remote attendee systems participating in the breakout session.

7. The system of claim 6, wherein the breakout interface displayed on each breakout programmable computer is configured to display a list of remote attendees who are participating in the breakout session.

8. The system of claim 7, wherein the breakout interface displayed on each breakout programmable computer is configured to include a window displaying an amount of time remaining in the breakout session.

9. The system of claim 1, wherein the providing associated with the out-of-class programmable systems further comprises displaying the results of the educational exercise to the presenter by the out-of-class system display to observe use of the out-of-class programmable systems by remote attendee systems.

10. A system for providing an electronic presentation by a presenter, the system comprising:
   a presentation center, wherein the presentation center comprises:
   a console programmable computer configured to provide a presentation control interface for directing visual content to a presentation display for viewing by a plurality of in-class participants;
   a camera configured to capture video data of the presenter;
   a microphone configured to capture audio data of the presenter; and
   one or more programmable computers configured to receive image data from the camera, audio data from the microphone, and the visual content displayed on the presentation display;
   a plurality of remote attendee systems;
   a plurality of in-class programmable systems in a classroom, at least one programmed to execute learning software to provide an educational exercise to at least one of the in-class participants;
   a plurality of out-of-class programmable systems, located in the same classroom as the plurality of in-class programmable systems and distinct from the plurality of in-class programmable systems, at least one out-of-class programmable system programmed to execute the learning software to provide the educational exercise to at least one of the remote attendee systems, wherein the each of out-of-class programmable systems is operated by a respective one of the plurality of remote attendee systems via the network;
   a demonstration computer configured to execute demonstrations by the presenter; and
   a connection server configured to establish a networking session with the presentation center for exchanging data with the presentation center, and configured to establish a separate networking session with each of the plurality of remote attendee systems for exchanging data with each remote attendee system, wherein:
   the connection server receives first data from the presentation center and distributes the first data to each of the remote attendee systems,
   the connection server receives second data from each of the remote attendee systems and sends the second data to the presentation center,
   the demonstration computer is configured to compress high bandwidth video data into low bandwidth video data for transmission over the network through the connection server;
   the demonstration computer is configured to display demonstrations on the presentation display for viewing by the in-class participants and to transmit the demonstrations to the connection server for display on a remote participant interface of each of the remote attendee systems over the network, and
   each remote attendee system is configured to receive and display the demonstrations on a demonstration window within a remote participant interface of each remote attendee system.

11. The system of claim 10, wherein the presentation center further comprises:
   a plurality of breakout programmable computer systems each comprising a breakout display, a breakout camera, a breakout microphone, a breakout speaker, and a breakout input device;
   wherein each breakout programmable computer is configured to:
   provide a virtual whiteboard on the breakout display for displaying inputs entered via the breakout input device,
   receive image data from the breakout camera and audio data from the breakout microphone,
   encode the image data and audio data into outgoing breakout data, transmit the outgoing breakout data to a subset of the plurality of remote attendee systems via the network,
   transmit the inputs entered via the breakout input device to the subset of the plurality of remote attendee systems, and
   receive encoded audio data from a remote attendee system included in the subset of the plurality of remote attendee systems, and output the received audio data via the breakout speaker.

12. The system of claim 11, wherein each breakout programmable computer is configured to display a breakout interface on the breakout display for a breakout session, and the breakout interface is displayed on a subset of remote attendee systems participating in the breakout session.

13. The system of claim 11, wherein each breakout programmable computer is configured to allow remote access by the presenter for the purpose of assisting with or reviewing progress of the breakout session.

14. The system of claim 10, wherein the providing associated with the plurality of out-of-class programmable systems further comprises displaying the results of the educational exercise to the presenter by the out-of-class system display to observe use of the out-of-class programmable systems by remote attendee systems.

15. A method of providing an electronic presentation comprising:
   providing a presentation control interface on a console programmable computer, the presentation control interface directing visual content to a presentation display for viewing by a plurality of in-class participants;
   capturing video data of a presenter by a camera;
   capturing audio data of the presenter by a microphone;
   receiving image data from the camera, audio data from the microphone, and the visual content displayed on the presentation display;
   encoding the image data, audio data, and visual content as outgoing data;
   transmitting the outgoing data to a plurality of remote attendee systems via a network;
   receiving incoming data from the plurality of remote attendee systems via the network;
   in response to the incoming data, outputting audio via a speaker;
   executing an educational exercise in a software learning environment on an in-class programmable system, the in-class programmable system located in a classroom and having a display and input device for operation by one of the plurality of in-class participants;
   executing the educational exercise in the software learning environment on an out-of-class programmable system, the out-of-class programmable system located in same classroom and having a display and input device, wherein the out-of-class programmable system is operated by one of the plurality of remote attendee systems via the network;

providing a demonstration computer that executes demonstrations by the presenter; and providing a connection server that exchanges data with the plurality of remote attendee systems over the network, wherein:

the demonstration computer is configured to compress high bandwidth video data into low bandwidth video data for transmission over the network through the connection server, the demonstrations by the presenter are displayed on the presentation display for viewing by the in-class participants and are transmitted to the connection server to send the demonstrations to a demonstration window of a remote participant interface of each remote attendee system over the network.

16. The method of claim 15, further comprising displaying the results of the educational exercise to the presenter by the out-of-class system display to observe use of the out-of-class programmable system by the remote attendee system.

* * * * *